United States Patent
Yamakoshi et al.

(10) Patent No.: US 10,576,968 B2
(45) Date of Patent: Mar. 3, 2020

(54) CONTROL SYSTEM, RELAY DEVICE AND CONTROL METHOD

(71) Applicant: Renesas Electronics Corporation, Tokyo (JP)

(72) Inventors: Yasuhiro Yamakoshi, Tokyo (JP); Yukitoshi Tsuboi, Tokyo (JP); Yutaka Igaku, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 261 days.

(21) Appl. No.: 15/635,569

(22) Filed: Jun. 28, 2017

(65) Prior Publication Data

US 2017/0297570 A1    Oct. 19, 2017

Related U.S. Application Data

(63) Continuation of application No. 14/819,860, filed on Aug. 6, 2015, now Pat. No. 9,725,088.

(30) Foreign Application Priority Data

Aug. 27, 2014    (JP) ................................. 2014-172433

(51) Int. Cl.
*B60W 30/00* (2006.01)
*B60W 30/09* (2012.01)
(Continued)

(52) U.S. Cl.
CPC ............ *B60W 30/09* (2013.01); *B60W 10/04* (2013.01); *B60W 10/06* (2013.01); *B60W 10/18* (2013.01);
(Continued)

(58) Field of Classification Search
None
See application file for complete search history.

(56) References Cited

U.S. PATENT DOCUMENTS 6,085,151 A * 7/2000 Farmer ................. G01S 7/023
342/70
6,263,262 B1 * 7/2001 Bitzer ................. B60T 8/1755
701/1

(Continued)

FOREIGN PATENT DOCUMENTS

JP    2002-314558 A    10/2002

OTHER PUBLICATIONS

Communication dated Feb. 12, 2016, from the European Patent Office in counterpart European Application No. 15181338.3.

*Primary Examiner* — Jonathan M Dager
(74) *Attorney, Agent, or Firm* — McDermott Will & Emery LLP

(57) ABSTRACT

A control system 9 according to the present invention is mounted on a moving object. The control system 9 includes: an observing device 92 which transmits observation result data indicating an observation result of surroundings of the moving object; a first control instruction device 91 which transmits first control data indicating the control contents determined based on the observation result data; a movement control device 93 which controls movement of the moving object; and a relay device 95 which relays the first control data transmitted from the first control instruction device 91, to the movement control device 93. When a second control instruction device 94 which transmits second control data indicating the control contents determined based on the observation result data is provided to the control system 9, the relay device 95 transmits the second control data instead of the first control data, to the movement control device 93.

6 Claims, 24 Drawing Sheets

(51) Int. Cl.

| | | |
|---|---|---|
| *G06F 13/00* | (2006.01) | |
| *H04L 12/00* | (2006.01) | |
| *H04L 12/64* | (2006.01) | |
| *B60W 10/06* | (2006.01) | |
| *B60W 50/029* | (2012.01) | |
| *B60W 10/184* | (2012.01) | |
| *B60W 50/00* | (2006.01) | |
| *B60W 10/04* | (2006.01) | |
| *B60W 10/18* | (2012.01) | |
| *B60W 10/20* | (2006.01) | |
| *B60W 50/04* | (2006.01) | |
| *G05B 15/02* | (2006.01) | |
| *B60W 50/02* | (2012.01) | |
| *B60W 50/14* | (2020.01) | |
| *G05B 19/042* | (2006.01) | |
| *G08G 1/16* | (2006.01) | |
| *G06K 9/00* | (2006.01) | |

(52) U.S. Cl.
CPC .......... *B60W 10/184* (2013.01); *B60W 10/20* (2013.01); *B60W 50/00* (2013.01); *B60W 50/0205* (2013.01); *B60W 50/029* (2013.01); *B60W 50/045* (2013.01); *B60W 50/14* (2013.01); *G05B 15/02* (2013.01); *G05B 19/0423* (2013.01); *G06F 13/00* (2013.01); *H04L 12/00* (2013.01); *H04L 12/6418* (2013.01); *B60W 2050/0006* (2013.01); *B60W 2050/009* (2013.01); *B60W 2050/0045* (2013.01); *B60W 2050/0052* (2013.01); *B60W 2420/42* (2013.01); *B60W 2420/52* (2013.01); *B60W 2550/20* (2013.01); *B60W 2710/18* (2013.01); *B60W 2710/20* (2013.01); *B60W 2720/10* (2013.01); *B60Y 2304/076* (2013.01); *G05B 2219/25032* (2013.01); *G06K 9/00362* (2013.01); *G06K 9/00805* (2013.01); *G08G 1/166* (2013.01); *G08G 1/167* (2013.01)

(56) References Cited

U.S. PATENT DOCUMENTS

| | | | |
|---|---|---|---|
| 7,832,762 B2 | 11/2010 | Breed | |
| 8,150,583 B2* | 4/2012 | Danner | B60R 21/0134 180/167 |
| 8,855,846 B2* | 10/2014 | Grzywna | G01C 21/005 244/189 |
| 8,903,568 B1* | 12/2014 | Wang | G05D 1/0016 701/2 |
| 9,158,978 B2* | 10/2015 | Forslund | B60R 21/0134 |
| 9,165,468 B2* | 10/2015 | Luo | B60W 30/12 |
| 9,720,413 B1* | 8/2017 | Lema | G05D 1/0088 |
| 10,053,229 B2* | 8/2018 | Tian | G03B 17/561 |
| 10,067,504 B1* | 9/2018 | Qu | G06F 1/3215 |
| 10,067,513 B2* | 9/2018 | Zhang | B64D 47/08 |
| 10,139,837 B2* | 11/2018 | Qin | B64C 39/024 |
| 2003/0171865 A1* | 9/2003 | Moser | B60G 17/0195 701/48 |
| 2004/0193347 A1* | 9/2004 | Harumoto | B60R 21/0132 701/45 |
| 2005/0004723 A1* | 1/2005 | Duggan | G05D 1/0061 701/24 |
| 2005/0073433 A1 | 4/2005 | Gunderson | |
| 2005/0134440 A1 | 6/2005 | Breed | |
| 2005/0159870 A1* | 7/2005 | Tohdo | B60W 50/00 701/48 |
| 2008/0319670 A1* | 12/2008 | Yopp | B60W 30/16 701/301 |
| 2009/0150034 A1* | 6/2009 | Ezoe | B60T 7/12 701/53 |
| 2009/0259401 A1* | 10/2009 | Edwards | G01S 7/062 701/301 |
| 2011/0276227 A1* | 11/2011 | Sugawara | B60T 7/042 701/41 |
| 2011/0304737 A1* | 12/2011 | Evans | G01S 3/781 348/169 |
| 2013/0145482 A1* | 6/2013 | Ricci | H04W 4/90 726/28 |
| 2013/0166103 A1* | 6/2013 | Ko | H04N 7/18 701/2 |
| 2013/0201316 A1 | 8/2013 | Binder | |
| 2013/0211689 A1* | 8/2013 | Mizutani | B60K 31/00 701/96 |
| 2013/0218412 A1 | 8/2013 | Ricci | |
| 2013/0321628 A1* | 12/2013 | Eng | B60R 1/00 348/148 |
| 2014/0049643 A1* | 2/2014 | Segerstrom | F21V 21/30 348/144 |
| 2014/0055254 A1* | 2/2014 | Adams | G08G 1/16 340/435 |
| 2014/0195113 A1* | 7/2014 | Lu | B60G 17/0165 701/37 |
| 2014/0222272 A1* | 8/2014 | Raste | B60T 8/1755 701/22 |
| 2014/0240464 A1* | 8/2014 | Lee | H04N 13/254 348/47 |
| 2014/0336848 A1* | 11/2014 | Saund | G08G 1/054 701/3 |
| 2014/0350815 A1* | 11/2014 | Kambe | B60T 7/22 701/70 |
| 2014/0350836 A1* | 11/2014 | Stettner | G01S 17/023 701/301 |
| 2015/0057891 A1* | 2/2015 | Mudalige | B60W 10/00 701/42 |
| 2015/0134232 A1* | 5/2015 | Robinson | G08G 1/0116 701/117 |
| 2015/0151750 A1* | 6/2015 | Tsuchiya | B60W 30/09 701/41 |
| 2015/0207964 A1* | 7/2015 | Bye | H04N 5/2251 348/211.99 |
| 2015/0350569 A1* | 12/2015 | Espersen | H04N 5/33 348/164 |
| 2016/0076892 A1* | 3/2016 | Zhou | B64C 39/024 701/3 |
| 2016/0125746 A1* | 5/2016 | Kunzi | G05D 1/0088 701/11 |
| 2016/0171330 A1* | 6/2016 | Mentese | G06K 9/3233 348/170 |
| 2016/0194079 A1* | 7/2016 | Montreuil | B64C 39/024 701/2 |
| 2016/0274338 A1* | 9/2016 | Davies | H04N 5/2254 |
| 2016/0280266 A1* | 9/2016 | Kawamata | B60W 10/184 |
| 2016/0288799 A1* | 10/2016 | Nguyen Van | B60W 50/029 |
| 2016/0291445 A1* | 10/2016 | Fisher, Sr. | G03B 15/006 |
| 2017/0006340 A1* | 1/2017 | Enke | H04N 21/44028 |
| 2017/0075351 A1* | 3/2017 | Liu | B64C 39/024 |
| 2017/0121034 A1* | 5/2017 | Fisher | B64C 39/024 |
| 2017/0198747 A1* | 7/2017 | Chen | B64D 47/08 |
| 2017/0329324 A1* | 11/2017 | Bachrach | G05D 1/0016 |
| 2018/0024570 A1* | 1/2018 | Hutson | B64D 47/08 701/4 |
| 2018/0094931 A1* | 4/2018 | Taylor | G01C 21/00 |
| 2018/0095463 A1* | 4/2018 | Castleman | B64C 39/024 |
| 2018/0096611 A1* | 4/2018 | Kikuchi | G08G 5/045 |
| 2018/0129212 A1* | 5/2018 | Lee | H04N 5/23238 |
| 2018/0136650 A1* | 5/2018 | Tian | B64C 39/024 |
| 2018/0173220 A1* | 6/2018 | Wang | G05D 1/0016 |
| 2018/0208311 A1* | 7/2018 | Zhang | B64C 39/024 |
| 2018/0267561 A1* | 9/2018 | Trench | G05D 1/101 |
| 2018/0288303 A1* | 10/2018 | Wang | G05D 1/0088 |
| 2018/0302548 A1* | 10/2018 | Bao | G03B 15/006 |
| 2018/0335178 A1* | 11/2018 | Bin | F16M 13/04 |
| 2018/0348764 A1* | 12/2018 | Zhang | G05D 1/0088 |
| 2018/0352170 A1* | 12/2018 | Zhao | H04N 5/2258 |
| 2018/0359419 A1* | 12/2018 | Hu | H04N 5/23238 |
| 2018/0362183 A1* | 12/2018 | Lorell | B64D 47/08 |

(56) References Cited

U.S. PATENT DOCUMENTS

| | | | |
|---|---|---|---|
| 2019/0002125 A1* | 1/2019 | Bin | B64D 47/08 |
| 2019/0004512 A1* | 1/2019 | Liu | H04N 5/247 |
| 2019/0011921 A1* | 1/2019 | Wang | G06K 9/00664 |

* cited by examiner

Fig. 7
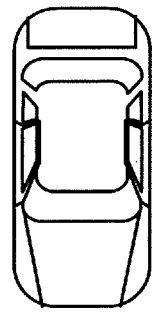
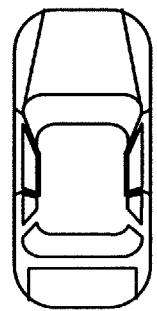
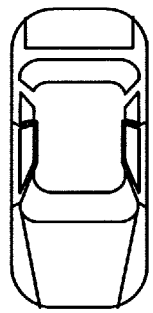
EMERGENCY BRAKE
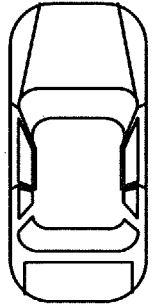
OWN CAR
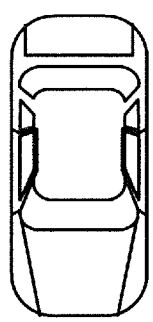

Fig. 8
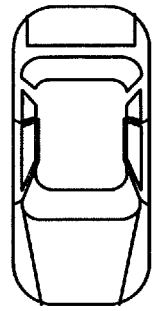
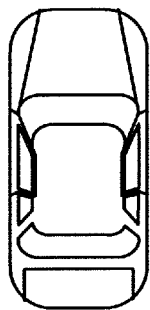
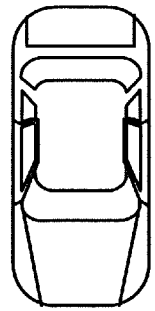
EMERGENCY BRAKE
WHILE TURNING
STEERING
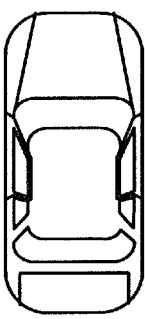
OWN CAR

US 10,576,968 B2

CONTROL SYSTEM, RELAY DEVICE AND CONTROL METHOD

CROSS-REFERENCE TO RELATED APPLICATIONS

This is a continuation of U.S. patent application Ser. No. 14/819,860, filed on Aug. 6, 2015, which is based upon and claims the benefit of priority from Japanese patent application No. 2014-172433, filed on Aug. 27, 2014. The entire disclosures of the prior applications are considered part of the disclosure of the accompanying continuation application, and are hereby incorporated by reference.

BACKGROUND

The present invention relates to a control system, a relay device and a control method and relates to, for example, a technique of performing control by transmitting and receiving data between a plurality of devices.

In recent years, in a social background which demands reduction of traffic accidents, reliving and easing of traffic jam and improvement of comfort of drivers, a drive assist network system for automatic driving is rapidly spreading. Statistical data shows that a cycle to buy a new car is a very long cycle such as about 10 years or more. By contrast with this, since each automaker makes a great effort to reduce traffic accidents, a new drive assist application program is developed at a shorter cycle than a cycle to buy a new car, and is applied to the latest car at the time of the development.

In the drive assist network system (in-vehicle system), each domain (a block in in-vehicle units) or each ECU (Electronic Control Unit) cooperates with each other. In this regard, a development span of an actuator control domain and ECU is generally very long such as 5-year units or 10-year units. Meanwhile, a development span of a drive assist domain and ECU is in a year unit. Hence, to enable addition of a new drive assist ECU for a purpose of updating a function of the drive assist network system, mounting in advance a mechanism which assumes the addition of a new drive assist system is necessary yet is very difficult.

Japanese Unexamined Patent Application Publication No. 2002-314558 discloses a technique of solving such a problem. A communication system disclosed in Japanese Unexamined Patent Application Publication No. 2002-314558 enables addition of an ECU by mounting on each ECU in advance a mechanism which changes items of individual data whose transmission destinations are only specific ECUs to items of global data whose transmission destinations are all ECUs according to a global change request.

SUMMARY

However, the technique disclosed in Japanese Unexamined Patent Application Publication No. 2002-314558 needs to mount the above mechanism on all ECUs in advance. Hence, there is a problem that the technique disclosed in Japanese Unexamined Patent Application Publication No. 2002-314558 involves a very great amount of changes in a system is required, and cannot be easily performed.

The other tasks and new features will be more apparent from the description of the specification and the accompanying drawings.

According to one embodiment, in a control system, when a second control instruction device that transmits second control data based on observation result data from an observing device is provided to the control system, a relay device transmits to a movement control device the second control data instead of first control data transmitted from a first control instruction device based on the observation result data from the observing device.

According to the one embodiment, it is possible to easily update a function.

BRIEF DESCRIPTION OF THE DRAWINGS

The above and other aspects, advantages and features will be more apparent from the following description of certain embodiments taken in conjunction with the accompanying drawings, in which:

FIG. 7 is a view for explaining an example of a drive assist function of a drive assist ECU according to the first embodiment;

FIG. 8 is a view for explaining an example of the drive assist function of an add-on ECU according to the first embodiment;

DETAILED DESCRIPTION

Preferred embodiments of the present invention will be described below with reference to the accompanying drawings. Specific numerical values described in the following embodiments are exemplary values for ease of understanding of the invention, and are not limited to those unless specified in particular. Further, obvious matters and the like for one of ordinary skill in the art will be optionally omitted and simplified in the following disclosure and drawings for clarification of explanation.

First Embodiment (Configuration of Drive Assist Network System 1)

Figure 1:
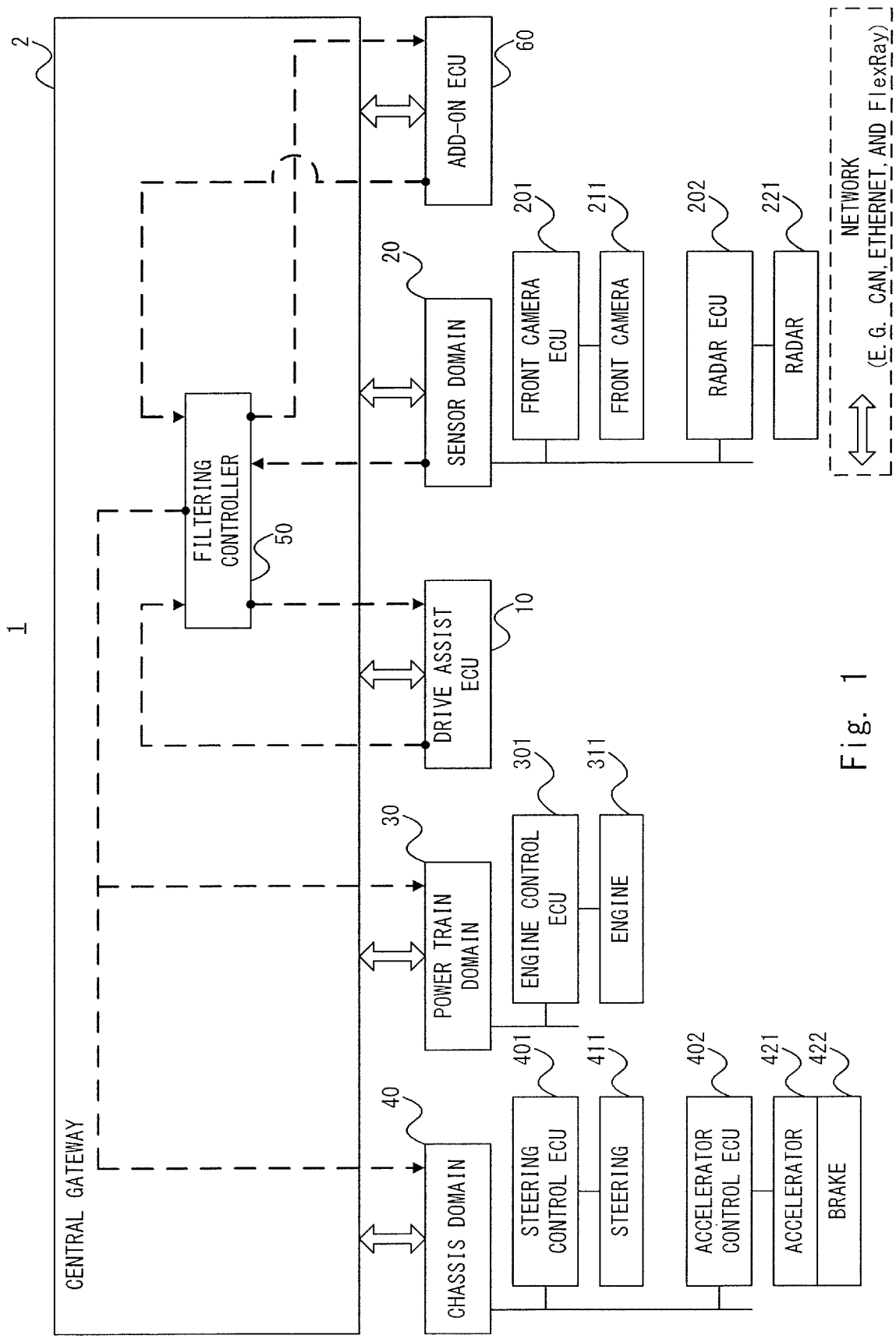
FIG. 1 is a view illustrating a configuration of a drive assist network system according to a first embodiment.

The first embodiment will be described below. A configuration of the drive assist network system 1 according to the first embodiment will be described with reference to FIG. 1. As illustrated in FIG. 1, the drive assist network system. 1 includes a central gateway 2, a drive assist ECU 10, a sensor domain 20, a power train domain 30, a chassis domain 40 and an add-on ECU 60. Further, the central gateway 2 includes a filtering controller 50. In the first embodiment, an example where the drive assist network system 1 is mounted on a car will be described.

Each of the ECUs and domains 10, 20, 30, 40 and 60 adopt arbitrary standards among various standards (communication protocols) such as a CAN (Controller Area Network), the Ethernet (registered trademark) and FlexRay for buses in ECU units or domain units. Hence, ECUs 201 and 202 in the sensor domain 20, ECUs 401 and 402 in the chassis domain 40, an ECU 301 in the power train domain 30, the drive assist ECU 10 and the add-on ECU 60 may be connected with the central gateway 2 according to different protocols. The central gateway 2 enables data transfer between the ECUs and domains 10, 20, 30, 40 and 60 by connecting the buses of the ECUs and domains 10, 20, 30, 40 and 60 with each other and converting the protocol when necessary.

The drive assist ECU 10 determines control contents of an own car based on an observation result of surroundings of the own car, and controls the own car according to the determined control contents. More specifically, the drive assist ECU 10 determines the control contents of the own car based on the observation result of the sensor domain 20, and instructs the power train domain 30 and the chassis domain 40 to control the own car according to the determined control contents. Thus, when, for example, recognizing an obstacle ahead of the own car, the drive assist ECU 10 controls the own car to hedge this obstacle and supports the driver's driving. In addition, the drive assist ECU 10 is not limited to control of this pre-crash safety system, and may control various types of automatic driving.

The sensor domain 20 includes the front camera ECU 201 and the radar ECU 202. The front camera ECU 201 is connected with a front camera 211. The radar ECU 202 is connected with a radar 221.

The front camera ECU 201 detects an obstacle in the surroundings of the own car based on an imaging result of the front camera 211, and notifies the drive assist ECU 10 of this detection result. More specifically, the front camera ECU 201 detects the obstacle in the surroundings of the own car based on image data received from the front camera 211, and generates object data indicating the detected obstacle. That is, the front camera ECU 201 performs primary processing on the image data (RAW data), and easily processes object data indicating the obstacle with a smaller amount of data. For example, this object data may be data which indicates a position, a size and a type (a car, a pedestrian or a bicycle) of a detected obstacle as data indicated as a list per detected obstacle. The front camera ECU 201 transmits the generated object data as sensor data to the drive assist ECU 10 through the central gateway 2.

The front camera 211 captures an image of the surroundings of the own car. The front camera 211 generates image data indicating the image of the surroundings of the own car by this imaging operation, and transmits the image data to the front camera ECU 201. The front camera 211 is typically installed in the own car to face toward the front of the own car.

The radar ECU 202 calculates calculated distance data based on measurement distance data of a distance to the obstacle in the surroundings of the own car measured by the radar 221, and notifies the drive assist ECU 10 of this calculated distance data. More specifically, the radar ECU 202 calculates a distance from the own car to the obstacle based on the measurement distance data received from the radar 221, and generates calculated distance data indicating the calculated distance to the obstacle. That is, the radar ECU 202 performs primary processing on measurement distance data (RAW data), and easily generates calculated distance data indicating a distance to the obstacle with a smaller amount of data.

For example, this calculated distance data may be point cloud data (data indicating an obstacle as a three-dimensional point group) indicating a distance to an obstacle at a larger granularity than that of measurement distance data. The radar ECU 202 indicates, for example, a small obstacle such as a pedestrian as a point group of a small granularity in point cloud data, and indicates an obstacle such as a car larger than the small obstacle as a point group of a large granularity. Hence, the drive assist ECU 10 may recognize an obstacle type according to a granularity of a point group indicating an obstacle in point cloud data by, for example, recognizing as a pedestrian an object indicated by a point group of a small granularity and recognizing as a car an object indicated by a point group of a large granularity. Further, the point cloud data makes it possible to specify a surface shape of an obstacle as a distance to each point of the obstacle. Hence, the drive assist ECU 10 may identify the obstacle type based on the surface shape of the obstacle specified based on the point cloud data.

Further, for example, this calculated distance data may be inter-car distance data indicating only a distance to a car ahead of the own car. The inter-car distance data may be data obtained by clipping from measurement distance data a range in which a car ahead of the own car exists, or may be data indicating only a distance to a car (obstacle) ahead of the own car indicated by object data by causing the radar ECU 202 to obtain the object data from the front camera ECU 201. The radar ECU 202 transmits the generated calculated distance data as sensor data to the drive assist ECU 10 through the central gateway 2.

The radar 221 measures a distance to an obstacle in the surroundings of the own car by an electromagnetic wave such as a light wave (including infrared ray) and a radio wave (including a millimeter wave). The radar 221 generates measurement distance data indicating a measured distance to an obstacle, and transmits the distance measurement data to the radar ECU 202. The radar 221 is typically installed in the own car to face forward.

The drive assist ECU 10 receives these items of sensor data as an observation result of the sensor domain 20, and determines control contents of the own car. Further, the drive assist ECU 10 generates control data indicating the determined control contents of the own car, and transmits the control data to the power train domain 30 and the chassis domain 40 through the central gateway 2.

The power train domain 30 includes an engine control ECU 301. The engine control ECU 301 is connected with an engine 311. The power train domain 30 transmits control data received from the drive assist ECU 10, to the engine control ECU 301.

The engine control ECU 301 controls the engine 311 according to the control data from the power train domain 30. More specifically, the engine control ECU 301 controls a fuel injection amount, ignition timing control and a variable valve timing of the engine 311 based on, for example, the control data received from the drive assist ECU 10.

The chassis domain 40 includes the steering control ECU 401 and the accelerator control ECU 402. The steering control ECU 401 is connected with a steering 411. The accelerator control ECU 402 is connected with an accelerator 421 and a brake 422. The chassis domain 40 transmits the control data received from the drive assist ECU 10, to the steering control ECU 401 and the accelerator control ECU 402.

The steering control ECU 401 controls the steering 411 according to the control data from the chassis domain 40. More specifically, the steering control ECU 401 controls a turning angle of the steering 411 based on, for example, the control data received from the drive assist ECU 10.

The accelerator control ECU 402 controls the accelerator 421 and the brake 422 according to the control data from the chassis domain 40. More specifically, the accelerator control ECU 402 controls a brake hydraulic pressure of the brake 422 based on, for example, the control data received from the drive assist ECU 10. Further, the accelerator control ECU 402 controls a throttle valve of the accelerator 421 based on, for example, the control data received from the drive assist ECU 10. That is, an example where the accelerator 421 is an electronic throttle will be described in the first embodiment.

The central gateway 2 includes the filtering controller 50. The filtering controller 50 relays sensor data transmitted from the sensor domain 20 to the drive assist ECU 10. Further, the filtering controller 50 plays a role of relaying the control data transmitted from the drive assist ECU 10, to the power train domain 30 and the chassis domain 40.

The add-on ECU 50 corresponds to a drive assist ECU configured by adding a function to (expanding a function of) the drive assist ECU 10. Hence, similar to the drive assist ECU 10, the add-on ECU 60 can also control the own car by generating control data based on sensor data transmitted from the sensor domain 20, and transmitting the generated control data to the power train domain 30 and the chassis domain 40.

In this regard, the add-on ECU 60 is additionally mounted on the drive assist network system 1. The drive assist network system 1 controls the own car by using the add-on ECU 60 instead of the drive assist ECU 10 when the add-on ECU 60 is mounted on the drive assist network system 1. In other words, when the add-on ECU 60 is mounted on the drive assist network system 1, the drive assist ECU 10 is disabled and the add-on ECU 60 is enabled. By this means, by additionally mounting the add-on ECU 60 on the drive assist network system 1, it is possible to update a drive assist function of the drive assist network system 1.

Further, the filtering controller 50 controls data transfer, so that the add-on ECU 60 instead of the drive assist ECU 10 can control the own car. More specifically, only control data transmitted from the add-on ECU 60 among the drive assist ECU 10 and the add-on ECU 60 is transmitted to the power train domain 30 and the chassis domain 40. That is, by discarding the control data transmitted from the drive assist ECU 10, the filtering controller 50 transmits the control data transmitted from the add-on ECU 60 instead of this control data to the power train domain 30 and the chassis domain 40. Thus, only the add-on ECU 60 can control the own car according to the control data. The power train domain 30 and the chassis domain 40 will be also collectively referred to as the "control domains 30 and 40" below.

(Frame Format of Data Frame)

Next, a format of data (e.g. sensor data and control data) transmitted in the central gateway 2 according to the first embodiment will be described with reference to FIG. 2. In this regard, an example where data relayed by the filtering controller 50 in the central gateway 2 is a data frame which complies with the CAN protocol will be described in the first embodiment. This data frame is a frame format illustrated in FIG. 2. In addition, the frame format of this CAN protocol is a general format, and therefore fields of the data frame related to processing of the present invention will be described and other fields will not be described.

Figure 2:
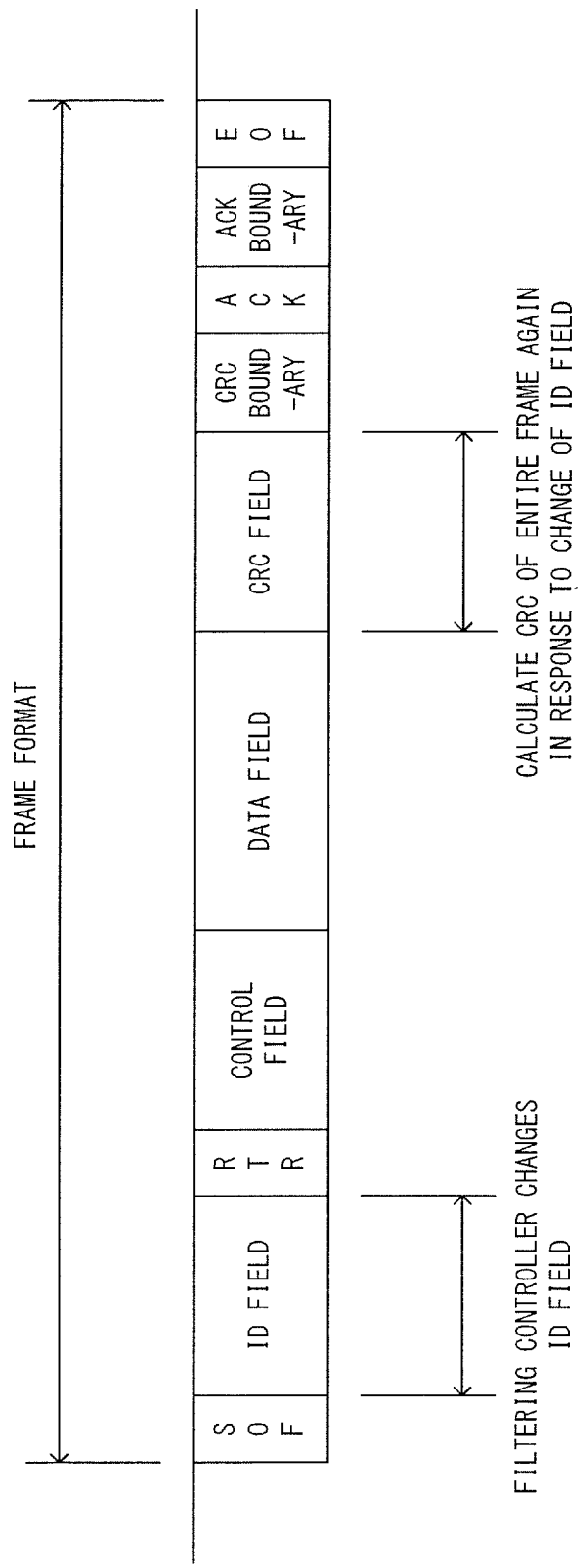
FIG. 2 is a view illustrating an example of a format of data transmitted through a central gateway according to the first embodiment.

The data frame includes an ID field, a control field, a data field and a CRC field as illustrated in FIG. 2.

The ID field is a portion which includes data indicating a frame ID in the data frame. The frame ID is information uniquely determined per data type or per ECU. According to the CAN protocol, each ECU transmits the data frame to all of the other ECUs by way of broadcasting. When the frame ID included in the received data frame is a processing target frame ID, each ECU executes processing based on this data frame.

For example, each of the ECUs 201 and 202 of the sensor domain 20 includes the frame ID of sensor data in the ID field, and transmits data frame including sensor data in the data field. In addition, strictly speaking, different frame IDs are set to the object data transmitted from the front camera ECU 201 and calculated distance data transmitted from the radar ECU 202. The drive assist ECU 10 and the add-on ECU 60 recognize in advance the frame ID of the sensor data as the frame ID of the processing target data frame. Hence, when the frame ID of the received data frame is the frame ID of the sensor data, the drive assist ECU 10 and the add-on ECU 60 execute processing of determining control contents of the own car based on the sensor data included in this data frame. Meanwhile, the control domains 30 and 40 do not recognize the frame ID of the sensor data as the frame ID of the processing target data frame. Hence, when the frame ID of the received data frame is the frame ID of the sensor data, the control domains 30 and 40 ignore this data frame, and do not execute processing based on the sensor data.

Further, for example, the drive assist ECU 10 and the add-on ECU 60 include the frame ID of the control data in the ID field, and transmits the data frame including the control data in the data field. In addition, strictly speaking, different frame IDs are set to the control data transmitted by the drive assist ECU 10 and the control data transmitted by the add-on ECU 60. That is, when items of data are the same type and transmission source ECUs are different, different frame IDs may be allocated to make it possible to distinguish that the items of data have been transmitted from different ECUs. Hereinafter, a case where a frame ID is different per ECU which transmits data, per data type and per combination thereof will be described in the first embodiment. The ECUs 301, 401 and 402 of the control domains 30 and 40 recognize the frame ID of the control data from the drive assist ECU 10 as the frame ID of the processing target data frame. Hence, when the frame ID of the received data frame is the frame ID of the control data from the drive assist ECU 10, the ECUs 301, 401 and 402 of the control domains 30 and 40 execute processing of controlling the own car based on the control data included in this data frame. Meanwhile, when the frame ID of the received data frame is the frame ID of the control data, the ECUs 201 and 202 of the sensor domain 20 do not execute processing based on the control data included in this data frame.

As described above, each ECU can identify processing target data, and execute processing based on this data. In this regard, the ECUs 301, 401 and 402 of the control domains 30 and 40 recognize the frame ID of the control data from the drive assist ECU 10 as the frame ID of the processing target data frame, yet do not recognize the frame ID of the control data from the add-on ECU 60 to be mounted later as the frame ID of the processing target data frame.

However, as described above, it is very difficult to mount the mechanism which assumes that the add-on ECU 60 is added later, on the ECUs 301, 401 and 402 of the control domains 30 and 40. By contrast with this, in the first embodiment, the mechanism in the filtering controller 50 described later disables the drive assist ECU 10 and enables the add-on ECU 60 by controlling the data frame.

The control filed is a portion including data including a length of a subsequent data field.

A CRC field is a portion of the data frame including a CRC (Cyclic Redundancy Check) value for performing error detection. An ECU which transmits a data frame calculates and sets the CRC value based on data of a plurality of fields including ID fields and data fields. Thus, the ECU which has received the data frame can detect a data error by calculating the CRC value from this data frame and comparing the CRC value and a CRC value included in the data frame.

(Configuration of Filtering Controller 50)

Figure 3:
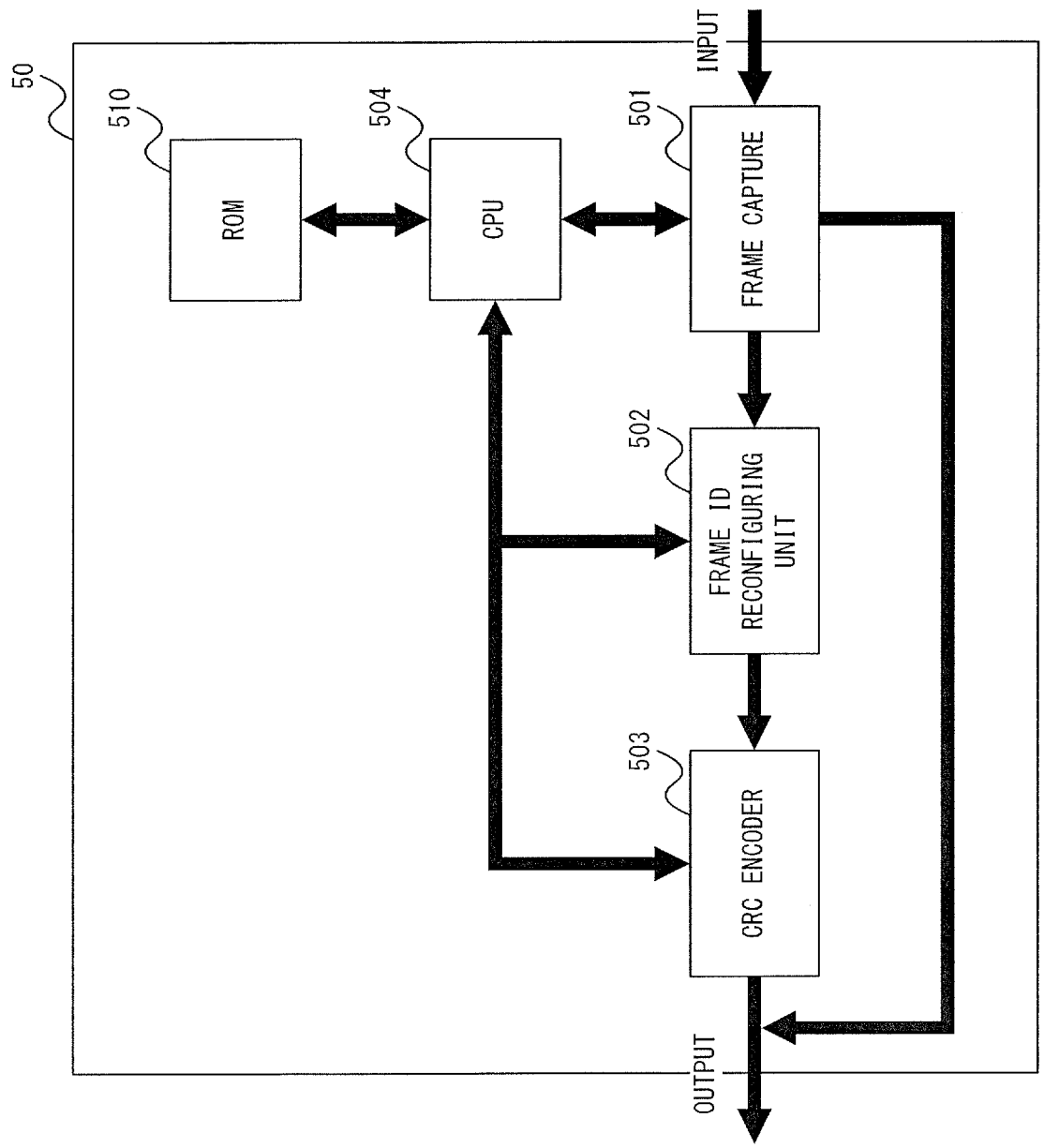
FIG. 3 is a view illustrating a configuration of a filtering controller according to the first embodiment.

Next, a configuration of the filtering controller 50 according to the first embodiment will be described with reference to FIG. 3. As illustrated in FIG. 3, the filtering controller 50 includes a frame capture 501, a frame ID reconfiguring unit 502, a CRC encoder 503, a CRC (Central Processing Unit) 504 and a ROM (Read Only Memory) 510.

The frame capture 501 obtains a data frame including a desired frame ID among data frames transmitted in the central gateway 2, and passes the data frame to the frame ID reconfiguring unit 502 or discards the data frame. The frame capture 501 transmits the other data frames to a transmission destination without transmitting the other data frames through the frame ID reconfiguring unit 502 and the CRC encoder 503.

The frame ID reconfiguring unit 502 changes the frame ID of the data frame passed from the frame capture 501.

The CRC encoder 503 calculates a CRC value based on the data frame whose frame ID has been changed by the frame ID reconfiguring unit 502. The CRC encoder 503 changes the CRC value included in the data frame, to the calculated CRC value. Further, the CRC encoder 503 transmits the data frame whose CRC value has been changed, to a transmission destination. Thus, the CRC value corresponding to the data frame of the changed frame ID is set to the data frame. Thus, it is possible to prevent error detection of a data error due to the change in the frame ID.

The CPU 504 integrally controls each unit 501 to 503 in the filtering controller 50. When, for example, the add-on ECU 60 is mounted on the drive assist network system 1, the CPU 504 notifies the frame capture 501 of the frame ID of the data frame to be obtained from the data frames transmitted in the central gateway 2. Further, when the add-on ECU 60 is mounted on the drive assist network system 1, the CPU 504 notifies the frame ID reconfiguring unit 502 of the frame ID reconfigured to the data frame.

In the ROM 510, frame ID data indicating a frame ID notified by the CPU 504 is stored in advance. This frame ID data may be stored in the ROM 510 before an operation of the drive assist network system 1 starts or may be written in the ROM 510 when the add-on ECU 60 is additionally mounted. Further, when the add-on ECU 60 is additionally mounted or when the drive assist network system 1 is activated (e.g. an ignition of the own car is powered on), the CPU 504 may read this frame ID data from the add-on ECU 60 to store in the ROM 510. In this case, preferably, this frame ID data is encrypted and transmitted from the add-on ECU 60 to the CPU 504 of the filtering controller 50. By so doing, it is possible to improve security.

Figure 4:
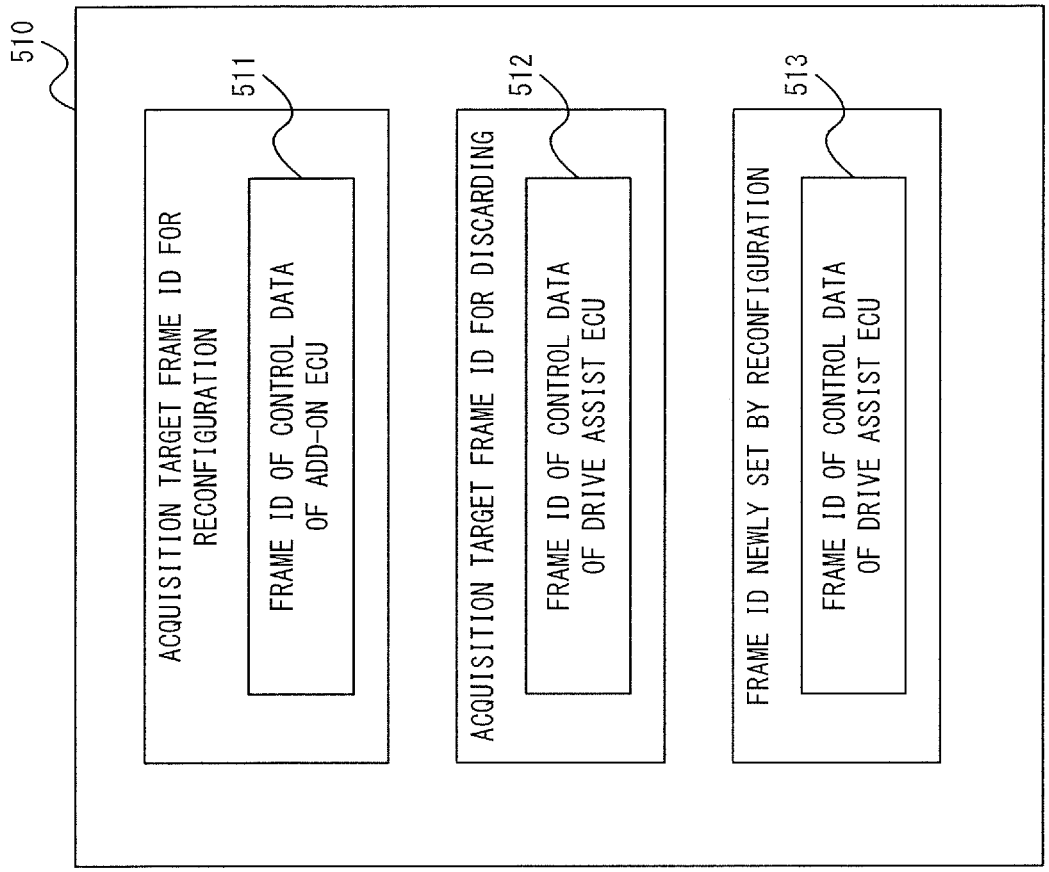
FIG. 4 is a view illustrating data of a ROM of the filtering controller according to the first embodiment.

Next, frame ID data stored in the ROM 510 will be described with reference to FIG. 4. As illustrated in FIG. 4, items of frame ID data 511 to 513 are stored in the ROM 510.

The frame ID data 511 is data indicating a frame ID of a data frame which the filtering controller obtains to reconfigure the frame ID. As illustrated in FIG. 4, the frame ID data 511 indicates a frame ID of control data transmitted from the add-on ECU 60. When the add-on ECU 60 is mounted on the drive assist network system 1, the CPU 504 obtains the frame ID data 511 from the ROM 510, and transmits the frame ID data 511 to the frame capture 501. Thus, the frame capture 501 obtains the frame ID indicated by the frame ID data 511 transmitted from the CPU 504, and recognizes the frame ID as a frame ID of a data frame to pass to the frame ID reconfiguring unit 502.

The frame ID data 512 is data indicating a frame ID of a data frame which the filtering controller 50 obtains to discard. As illustrated in FIG. 4, the frame ID data 512 indicates a frame ID of control data transmitted from the drive assist ECU 10. When the add-on ECU 60 is mounted on the drive assist network system 1, the CPU 504 obtains the frame ID data 512 from the ROM 510, and transmits the frame ID data 512 to the frame capture 501. Thus, the frame capture 501 obtains the frame ID indicated by the frame ID data 512 transmitted from the CPU 504, and recognizes the frame ID as a frame ID of a data frame to be discarded.

The frame ID data 513 is data indicating a frame ID newly set to a data frame when the filtering controller 50 reconfigures the frame ID. As illustrated in FIG. 4, the frame ID data 513 indicates a frame ID of control data transmitted from the drive assist ECU 10. When the add-on ECU 60 is mounted on the drive assist network system 1, the CPU 504 obtains the frame ID data 513 from the ROM 510, and transmits the frame ID data 513 to the frame ID reconfiguring unit 502. Thus, the frame ID reconfiguring unit 502 recognizes the frame ID indicated by the frame ID data 513 transmitted from the CPU 504, as a frame ID newly set to the data frame obtained by the frame capture 501.

In addition, the other data frames are outputted to a transmission destination as is from the filtering controller 50. In this regard, upon, for example, activation of the drive assist network system 1, the CPU 504 obtains the items of the frame ID data 511 to 513 from the ROM 510, and transmits the items of the frame ID data 511 to 513 to the frame capture 501 and the frame ID reconfiguring unit 502.

In this regard, as described above, the frame ID takes different value per data type. However, for simplification of description, a frame ID of control data transmitted from the drive assist ECU 10 will be also referred to as "a frame ID of the drive assist ECU 10", and a frame ID of control data transmitted from the add-on ECU 60 will be also referred to as "a frame ID of the add-on ECU 60" below.

(Processing of Filtering Controller 50)

Figure 5:
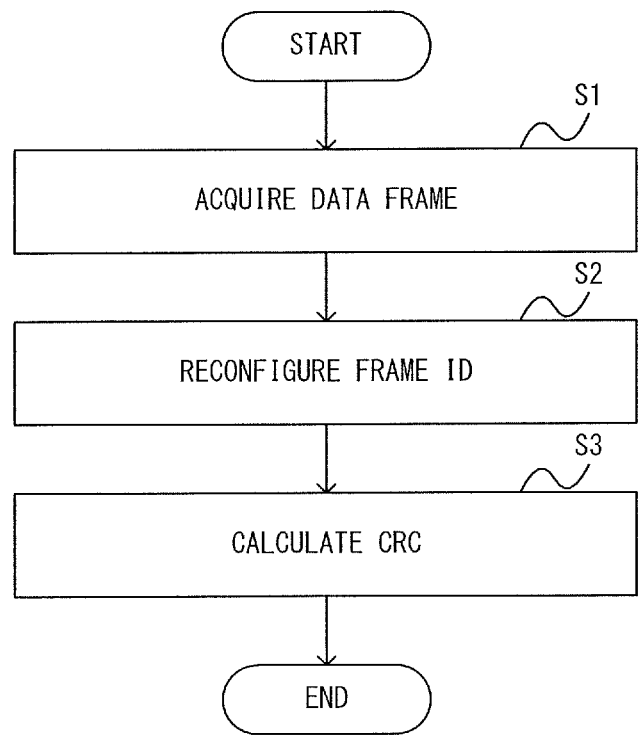
FIG. 5 is a flowchart illustrating processing of the filtering controller according to the first embodiment.

Next, processing of the filtering controller 50 according to the first embodiment will be described with reference to FIG. 5.

The frame capture 501 obtains a data frame including a frame ID of a frame ID reconfiguration target data frame among data frames flowing in the central gateway 2 (S1). That is, the frame capture 501 obtains the data frame indicating the frame ID indicated by the frame ID data 511 transmitted from the CPU 504. In other words, the frame capture 501 obtains a data frame indicating the frame ID of the add-on ECU 60. Further, the frame capture 501 transmits this data frame to the frame ID reconfiguring unit 502.

In addition, the frame capture 501 obtains a data frame including a frame ID of a discard target data frame, too, among the data frames flowing in the central gateway 2. That is, the frame capture 501 obtains a data frame indicating a frame ID indicated by the frame ID data 512 transmitted from the CPU 504 (S1). In other words, the frame capture 501 obtains the data frame indicating the frame ID of the drive assist ECU 10. Further, the frame capture 501 discards this data frame.

The frame ID reconfiguring unit 502 reconfigures the frame ID of the data frame transmitted from the frame capture 501 (S2). That is, the frame ID reconfiguring unit 502 sets to the data frame the frame ID indicated by the frame ID data 513 transmitted from the CPU 504. In other words, the frame ID reconfiguring unit 502 changes the frame ID included in the data frame from the frame ID of the add-on ECU 60 to the frame ID of the drive assist ECU 10. The CRC encoder 503 calculates a CRC value of the data frame to which the frame ID has been reconfigured by the frame ID reconfiguring unit 502, and sets the CRC value to this data frame (S3).

Consequently, when the add-on ECU 60 is mounted on the drive assist network system 1, it is possible to transmit control data transmitted from the add-on ECU 60 instead of control data transmitted from the drive assist ECU 10, to the control domains 30 and 40. Further, the frame ID of the data frame of this control data is changed to the frame ID from the drive assist ECU 10, so that it is possible to cause the control domains 30 and 40 to tentatively recognize the control data from the add-on ECU 60 as processing target control data from the drive assist ECU 10. That is, according to this processing, it is possible to disable the drive assist ECU 10 and enable the add-on ECU 60 by additionally mounting the add-on ECU 60 on the drive assist network system 1.

(Processing of Drive Assist Network System 1)

Figure 6:
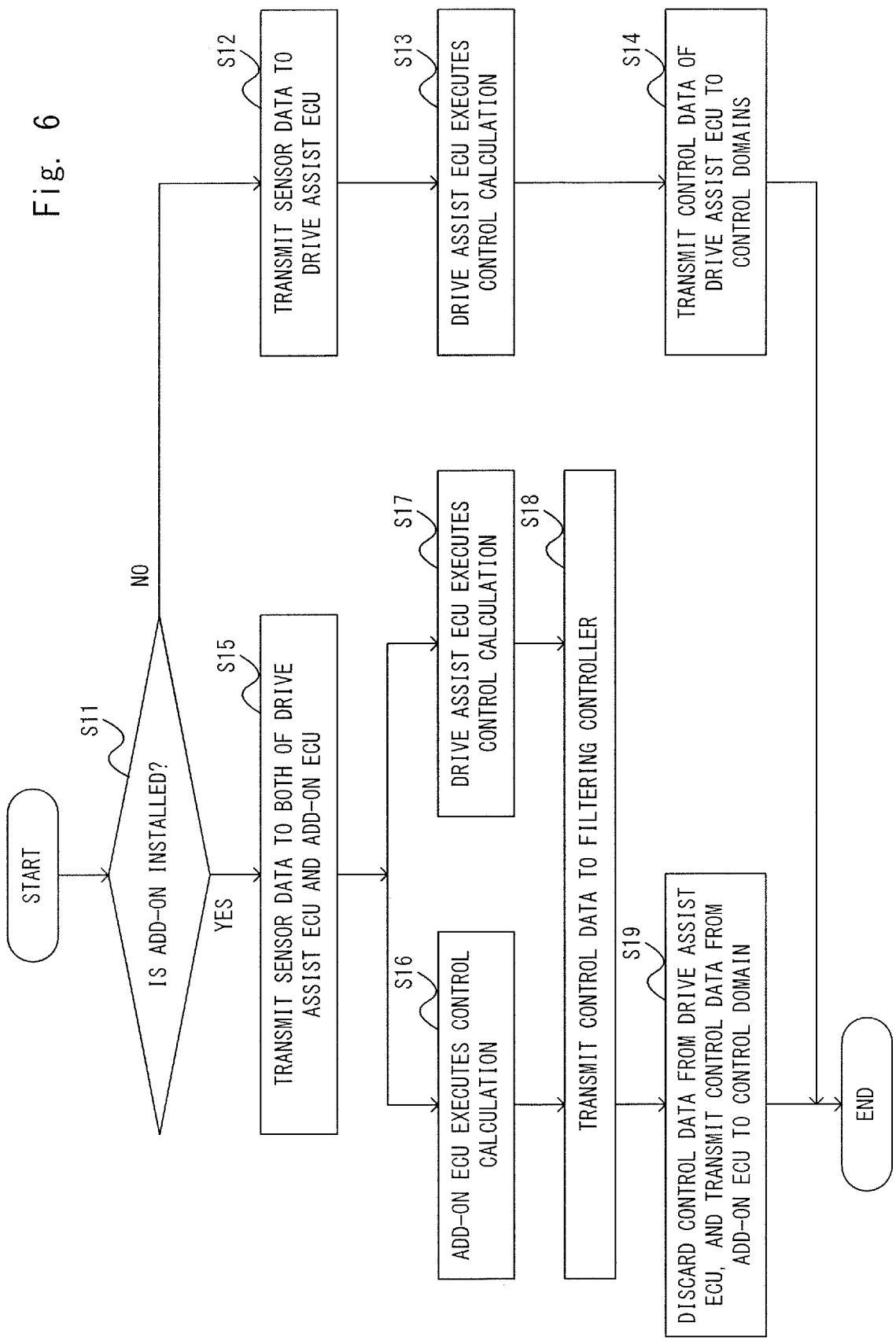
FIG. 6 is a flowchart illustrating processing of the drive assist network according to the first embodiment.

Next, processing of the drive assist network system 1 according to the first embodiment will be described with reference to FIG. 6.

The filtering controller 50 determines whether or not the add-on ECU 60 is connected to the central gateway 2 (S11). In this regard, whether or not the add-on ECU 60 is physically connected to the central gateway 2 may be simply determined. However, the determination is not limited to this. In addition, the filtering controller 50 may authenticate authentication information by receiving the authentication information from the add ECU 60, and determine that the add-on ECU 60 has been connected with the central gateway 2 when validity of the add-on ECU 60 can be confirmed.

For example, an expectation value of the authentication information of the add-on ECU 60 is stored in advance in the ROM 510 included in the filtering controller 50. This expectation value may be stored in the ROM 510 before an operation of the drive assist network system 1 starts or may be written in the ROM 510 when the add-on ECU 60 is additionally mounted. This authentication information is, for example, information indicating an identifier (ID) uniquely allocated to each ECU. The filtering controller 50 compares the authentication information transmitted from the add-on ECU 60 and the expectation value stored in the ROM 510. The filtering controller 50 determines that the add-on ECU 60 is valid when the authentication information and the expectation value match, and determines that the add-on ECU 60 is not valid when the authentication information and the expectation value do not match.

When determining that the add-on ECU 60 is not connected to the central gateway 2 (S11: No), the filtering controller 50 transmits the sensor data transmitted from the sensor domain 20, to the drive assist ECU 10 (S12). The drive assist ECU 10 calculates control data based on the sensor data transmitted from the sensor domain 20 through the filtering controller 50 (S13). The drive assist ECU 10 transmits the generated control data to the control domains 30 and 40 (S14). This control data is relayed at the filtering controller 50, and the filtering controller 50 transmits the control data as is to the control domains 30 and 40.

When determining that the add-on ECU 60 is connected to the filtering controller 50 (S11: Yes), the filtering controller 50 transmits the sensor data transmitted from the sensor domain 20 to both of the drive assist ECU 10 and the add-on ECU 60 (S15). The add-on ECU 60 calculates control data based on the sensor data transmitted from the sensor domain 20 through the filtering controller 50 (S16). Similar to step S13, the drive assist ECU 10 also calculates control data based on the sensor data transmitted from the sensor domain 20 through the filtering controller 50 (S17). The drive assist ECU 10 and the add-on ECU 60 transmit the calculated control data to the filtering controller 50 (S18). The filtering controller 50 discards the control data transmitted from the drive assist ECU 10, and transmits the control data from the add-on ECU 60 as the control data from the drive assist ECU 10 to the control domains 30 and 40 (S19).

According to the above-described processing, by connecting the add-on ECU 60, it is possible to control the own car by a drive assist function of the add-on ECU 60 whose function has been expanded instead of the drive assist function of the drive assist ECU 10.

(Example of Drive Assist Function)

Next, an example of the drive assist function of the drive assist ECU 10 and the drive assist function of the add-on ECU 60 will be described with reference to FIGS. 7 and 8. An example where a collision prediction emergency automatic brake system which operates when the own car drives at a certain speed or less is mounted as the drive assist function on the drive assist ECU 10, and a function which automatically performs a steering operation is mounted as the drive assist function on the add-on ECU 60 in addition to the collision prediction emergency automatic brake system which operates when the own car drives at a certain speed or less will be described.

First, the example of the drive assist function of the drive assist ECU 10 will be described with reference to FIG. 7. When the own car continues driving, the drive assist ECU 10 determines based on sensor data whether or not the own car is likely to collide with an obstacle (a car driving ahead of the own car in the example in FIG. 7) ahead of the own car. More specifically, the drive assist ECU 10 determines that collision is likely to occur when a distance between the own car and the obstacle is a threshold or less, and determines that collision is not likely occur when the distance between the own car and the obstacle is larger than the threshold. This threshold is a value arbitrarily determined in advance. The drive assist ECU 10 keeps controlling the own car by a driver's operation in a manual operation mode when determining that collision is not likely to occur. Meanwhile, the drive assist ECU 10 switches to an automatic operation mode when determining that collision is likely to occur. That is, a control right of the own car is transferred from the driver to the drive assist network system 1. Further, the drive assist ECU 10 determines an emergency brake as control contents of the own car. That is, the drive assist ECU 10 generates control data indicating content contents for putting on an emergency brake, and transmits the control data to the control domains 30 and 40.

Next, the example of the drive assist function of the add-on ECU 60 will be described with reference to FIG. 8. When the own car continues driving, the add-on ECU 60 also determines based on sensor data whether or not the own car is likely to collide with an obstacle (a car driving ahead of the own car and a car crossing ahead of the own car in the example in FIG. 8) ahead of the own car. The determination has been described above with reference to FIG. 7 and therefore will not be described in detail. That is, the add-on ECU 60 has a function expanded from that of the drive assist ECU 10 and has a function of switching to the automatic operation mode according to whether or not collision is likely to occur similar to the drive assist ECU 10, so that it is possible to hedge collision with an obstacle by putting on the emergency brake likewise in the example illustrated in FIG. 7.

In this regard, the add-on ECU 60 further has an additional function of determining whether or not a steering operation needs to be performed. According to this function, when, for example, there is an obstacle at a right side of a traveling direction of the own car among obstacles whose distances to the own car are the threshold or less, the add-on ECU 60 determines that the steering operation needs to be performed and determines detouring to the left side as control contents of the own car. That is, the add-on ECU 60 can determine detouring of the own car to an opposite side to a side of the obstacle based on the traveling direction of the own car. Hence, the add-on ECU 60 generates control data indicating control contents for putting on an emergency brake while turning the steering to the left, and transmits the control data to the control domains 30 and 40.

In addition, an example where (1) a distance between an own car and an obstacle and (2) a position of the obstacle based on a traveling direction of the own car are used as parameters for determining control contents of the own car has been described, yet parameters are not limited to these. In addition, (3) the number of obstacles, (4) a speed of the own car and (5) a moving direction of an obstacle may be used as parameters for determining control contents of the own car. That is, arbitrary one or more parameters (1) to (5) may be used.

In case where, for example, (3) is used, when there are a predetermined number of obstacles or more whose distances to the own car are the threshold or less, an operation mode is switched to the automatic operation mode to put on the emergency brake, and, when the number of obstacles whose distances to the own car are the threshold or less is less than a predetermined number, the manual operation mode may be kept.

Further, in case where, for example, (4) is used, when a time which the own car takes to reach an obstacle is calculated based on a distance between the own car and the obstacle and the speed of the own car, and the time is a threshold or less, the operation mode is switched to the automatic operation mode to put on the emergency brake and, when the time is larger than the threshold, the manual operation mode may be kept.

Furthermore, in case where, for example, (5) is used, when an obstacle approaches the own car, an operation mode is switched to the automatic operation mode to put on the emergency brake and, when the obstacle moves away from the own car, the manual operation mode may be kept. Still further, in this case, the time which the own car takes to reach the obstacle is calculated by using the speed of the obstacle, too, based on the distance between the own car and the obstacle and the speeds of the own car and the obstacle, and the time is the threshold or less, the operation mode is switched to the automatic operation mode to put on the emergency brake and, when the time is larger than the threshold, the manual operation mode may be kept.

Further, the degree to hedge an obstacle (e.g. the degree of braking or a turning degree of a steering) may be changed stepwise. For example, a table in which distances between the own car and obstacles and the degree of braking are associated is stored in advance in ROMs included in the drive assist ECU 10 and the add-on ECU 60. This table is information indicating a stronger degree of braking as the distance between the own car and an obstacle shortens. Further, the drive assist ECU 10 and the add-on ECU 60 determine the degree of braking according to a distance between the own car and the obstacle based on this table.

Modified Example of First Embodiment

A case where a CAN protocol has been adopted as a communication protocol used to transmit data in a central gateway 2 has been described above. However, the communication protocol is not limited to this. For example, a TCP/IP protocol may be adopted as a communication protocol which relays data through a filtering controller 50 in the central gateway 2. In this case, a date frame has a frame format illustrated in FIG. 9. In addition, a frame format of this TCP/IP protocol is a general frame format, and therefore fields related to processing of the present embodiment will be described and other fields will not be described.

Figure 9:
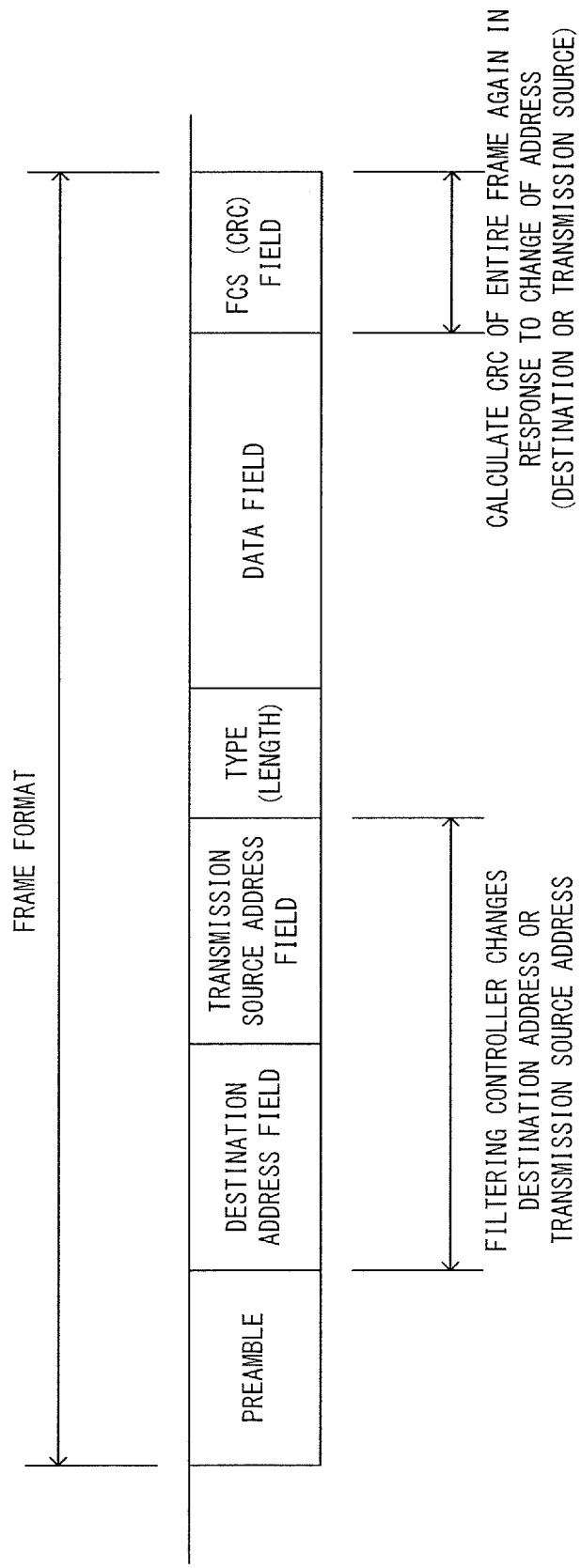
FIG. 9 is a view illustrating another example of a format of data transmitted through the central gateway according to the first embodiment.

In this case, as illustrated in FIG. 9, a data frame includes a destination address field, a transmission source address field, a data field and a FCS (Frame Check Sequence) field.

In this case, in a ROM 510 of the filtering controller 50, address data indicating a transmission source address of a data frame to obtain is stored instead of a frame ID data of control data included in a data frame to obtain. That is, in the ROM 510, address data of a drive assist ECU 10 is stored in advance as a transmission address of a data frame to obtain to discard, and address data of an add-on ECU 60 is stored in advance as a transmission source address of a data frame to obtain to reconfigure a frame ID. Further, a CPU 504 obtains these items of address data from the ROM 510, and transmits these items of address data to a frame capture 501. Thus, the frame capture 501 discards the data frame including the control data from the drive assist ECU 10, and transmits a data frame including the control data from the add-on ECU 60, to a frame ID reconfiguring unit 502.

Further, in the ROM 510, address data indicating a transmission source address reconfigured to a data frame is stored instead of frame ID data indicating a frame ID reconfigured to a data frame. Further, the CPU 504 transmits this address data to the frame ID reconfiguring unit 502. Thus, the frame ID reconfiguring unit 502 tentatively changes a transmission source address of a data frame including the control data transmitted from the add-on ECU 60, from the address of the add-on ECU 60 to an address of the drive assist ECU 10. Hence, in this case, the frame ID reconfiguring unit 502 operates as an address reconfiguring unit.

In addition, a destination address of a data frame of sensor data from the sensor domain 20 indicates the drive assist ECU 10, but the add-on ECU 60 can obtain the data frame by reading the destination address as a data frame to the add-on ECU 60. Further, a destination address of a data frame of the sensor data from this sensor domain 20 to be transmitted to the add-on ECU 60 may be reconfigured by the filtering controller 50 to indicate the add-on ECU 60. Reconfiguring this destination address as an address of the add-on ECU 60 only needs to be performed in the same way as the method described later in the second embodiment.

Further, a CRC encoder 503 calculates a CRC value based on a data frame whose transmission source address has been changed. The CRC encoder 503 changes the CRC value set to the FCS field of the data frame, to a newly calculated CRC value. In addition, the CRC value is calculated based on data of a plurality of fields including a destination address field, a transmission source address field and a data field.

As described above, according to the first embodiment, it is possible to provide an advanced drive assist function to be mounted on the add-on ECU 60 only by mounting the add-on ECU 60 on a drive assist network system 1. Further, the filtering controller 50 mounted inside the central gateway 2 performs control as if the existing drive assist ECU 10 issued an instruction, so that it is possible to suppress changes in other domains 20, 30, 40, other ECUs 201, 301, 401, 402 and power train and chassis control target devices (an engine 311, a steering 411, an accelerator 421 and a brake 422) as much as possible, and perform an operation without significantly influencing an existing system.

Second Embodiment

Next, the second embodiment will be described. The same contents as those in the first embodiment will be described below while optionally omitting the contents by assigning the same reference numerals.

In the first embodiment, a method of transmitting sensor data to both of a drive assist ECU 10 and an add-on ECU 60 and transmitting only data of the add-on ECU 60 to control domains 30 and 40 has been described as a method of disabling the drive assist ECU 10 and enabling the add-on ECU 60. However, the present invention is not limited to this.

In the second embodiment, a method of transmitting sensor data only to the add-on ECU 60 will be described as another method of disabling the drive assist ECU 10 and the enabling the add-on ECU 60.

(Configuration of Drive Assist Network System 1 According to Second Embodiment)

A configuration of the drive assist network system 1 according to the second embodiment is the same as the configuration of the drive assist network system 1 according to the first embodiment described with reference to FIG. 1, and therefore will not be described. In addition, the second embodiment will be described assuming that transmission in a central gateway 2 is also performed according to a CAN protocol.

(Configuration of Filtering Controller 50 According to Second Embodiment)

The configuration of the filtering controller 50 according to the second embodiment is the same as the configuration of the filtering controller 50 according to the first embodiment described with reference to FIG. 3. However, the filtering controller 50 according to the second embodiment differs from the filtering controller 50 according to the first embodiment in the following operation.

A frame capture 501 acquires a data frame including sensor data transmitted from a sensor domain 20. Further, the frame capture 501 transmits the acquired data frame to the add-on EU 60 instead of the drive assist ECU 10 without transmitting the data frame to the drive assist ECU 10. Hence, in the second embodiment, sensor data is outputted from the filtering controller 50 individually (to the drive assist ECU 10 and the add-on ECU 60) as illustrated in FIG. 1. Consequently, only the add-on ECU 60 calculates control data based on the sensor data. Hence, only the add-on ECU 60 controls an own car.

Hence, a CPU 504 notifies the frame capture 501 of a frame ID of the sensor data from the sensor domain 20, too, as a frame ID of a data frame to obtain to prevent the data frame from being transmitted to the drive assist ECU 10. That is, in a ROM 510 included in the filtering controller 50, frame ID data indicating the sensor data from the sensor domain 20 is stored in advance as a frame ID of a data frame to obtain to transmit to the add-on ECU 60. In this regard, frame IDs of sensor data includes two types of a frame ID of object data from a front camera ECU 201 and a frame ID of calculated distance data from a radar ECU 202. Thus, the frame capture 501 transmits the sensor data from the sensor domain 20 to the add-on ECU 60 based on the frame ID data obtained by the CPU 504 from the ROM 510 and transmitted without transmitting the sensor data to the drive assist ECU 10.

Consequently, control data based on the sensor data is not transmitted from the drive assist ECU 10, so that the frame capture 501 does not need to perform processing of discarding the control data obtained from the drive assist ECU 10. In a modified example of the second embodiment, the CPU 504 may not notify the frame capture 501 of a frame ID of the drive assist ECU 10 as a frame ID of a data frame to discard.

Consequently, when the add-on ECU 60 is mounted on the drive assist network system 1, it is possible to transmit the sensor data transmitted from the sensor domain 20 to the add-on ECU 60 instead of the drive assist ECU 10. Consequently, it is possible to disable the drive assist ECU 10, enable the add-on ECU 60 and transmit control data transmitted only form the add-on ECU 60, to the control domains 30 and 40.

(Processing of Drive Assist Network System 1 According to Second Embodiment)

Figure 10:
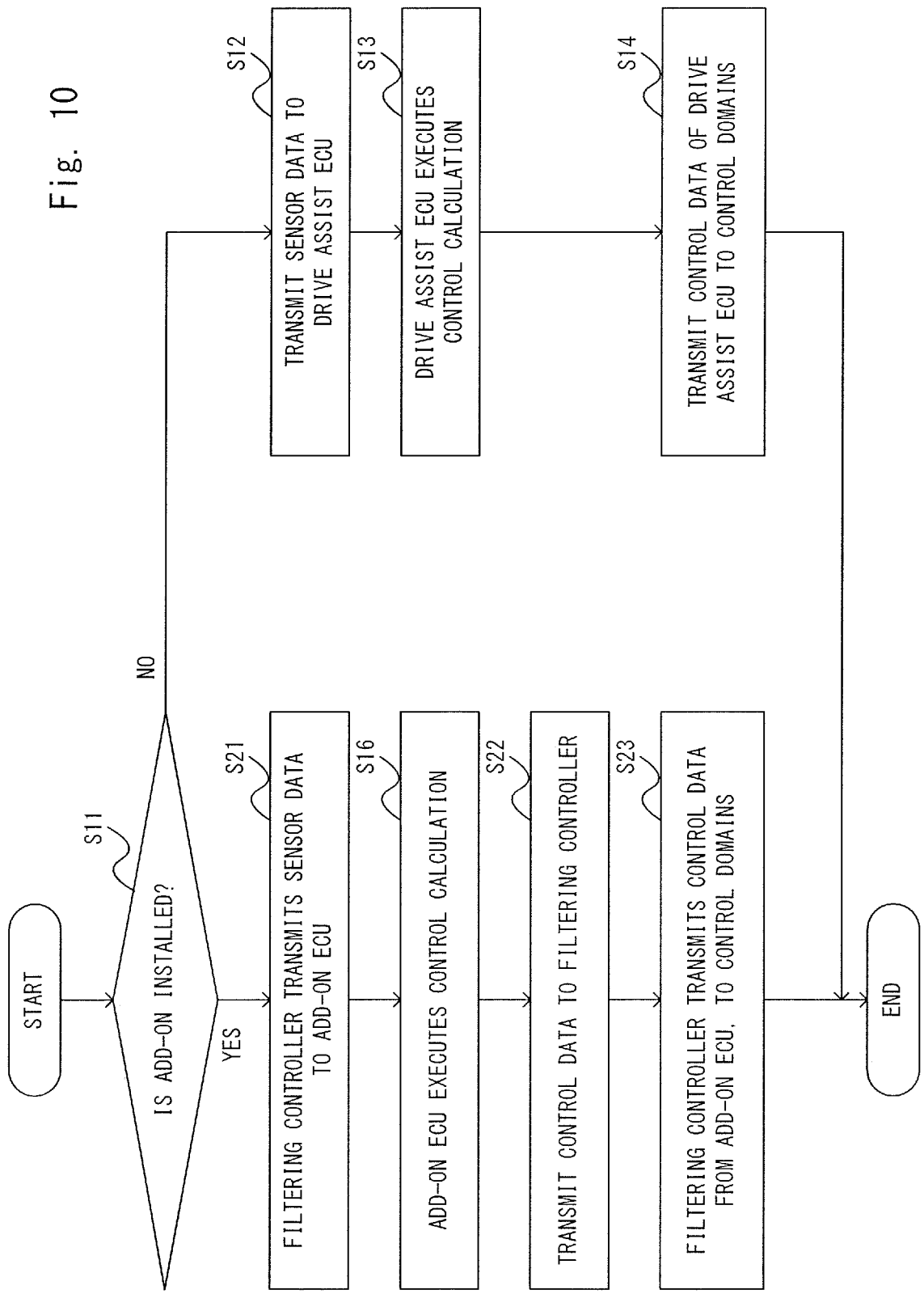
FIG. 10 is a flowchart illustrating processing of a drive assist network system according to a second embodiment.

Next, processing of the drive assist network system 1 according to the second embodiment will be described with reference to FIG. 10.

The processing illustrated in FIG. 10 differs from the processing in the first embodiment described with reference to FIG. 6 including step S21 instead of step S15, not including step S17, and including steps S22 and S23 instead of steps S18 and S19 in case of Yes in step S11.

When determining that the add-on ECU 60 is connected to the filtering controller 50 (S11: Yes), the filtering controller 50 transmits the sensor data transmitted from the sensor domain 20 to the add-on ECU 60 without transmitting the sensor data to the drive assist ECU 10 (S21).

After step S16 is executed, the add-on ECU 60 transmits the calculated control data to the filtering controller 50 (S22). That is, a difference from step S18 in the first embodiment includes that the drive assist ECU 10 does not transmit control data. The filtering controller 50 transmits control data from the add-on ECU 60 as control data from the drive assist ECU 10 to the control domains 30 and 40 (S23). That is, a difference from step S19 in the first embodiment includes that the control data is not transmitted from the drive assist ECU 10, and therefore the filtering controller 50 does not obtain and discard the control data transmitted from the drive assist ECU 10.

In addition, similar to the first embodiment, in the second embodiment, communication protocols which are used to transmit data in the central gateway 2 and are other than the CAN protocol may be also be adopted.

When, for example, a TCP/IP protocol is adopted, in the ROM 510, items of address data of the ECUs 201 and 202 of the sensor domain 20 are also stored in advance as transmission addresses of a data frame which is obtained and whose transmission to the drive assist ECU 10 is prevented. Further, the CPU 504 transmits these items of address data to the frame capture 501. Thus, the frame capture 501 obtains items of sensor data of the ECUs 201 and 202 of the sensor domain 20 based on the address data transmitted from the CPU 504.

Further, in the ROM 510, address data indicating a destination address to be reconfigured to a data frame of sensor data is also stored. This destination address is an address of the add-on ECU 60. Further, the CPU 504 transmits this address data to a frame ID reconfiguring unit 502. Thus, the frame ID reconfiguring unit 502 changes the destination address of the data frame of the sensor data obtained by the frame capture 501 from the address of the drive assist ECU 10 to the address of the add-on ECU 60. Consequently, the sensor data is not transmitted to the drive assist ECU 10, and is transmitted only to the add-on ECU 60. Consequently, in this case, the frame ID reconfiguring unit 502 operates an address reconfiguring unit.

As described above, similar to the first embodiment, according to the second embodiment, it is possible to reduce an entire change amount of the drive assist network system 1 as much as possible, and update a drive assist function to an advanced drive assist function.

Third Embodiment

Next, a third embodiment will be described. The same contents as those in the first embodiment will be described below while optionally omitting the contents by assigning the same reference numerals.

In the first embodiment, control data from a drive assist ECU 10 is simply discarded and only data of an add-on ECU 60 is transmitted to control domains 30 and 40. However, in the third embodiment, a system whose safety is further improved is realized by effectively using control data from the drive assist ECU 10. More specifically, in the third embodiment, a combination of the drive assist ECU 10 and the add-on ECU 60 is regarded as a redundant system to perform failure diagnosis.

(Configuration of Drive Assist Network System 1 According to Third Embodiment)

The configuration of the drive assist network system 1 according to the third embodiment is the same as the configuration of the drive assist network system 1 according to the first embodiment described with reference to FIG. 1. However, the drive assist network system 1 according to the third embodiment differs from the drive assist network system 1 according to the first embodiment in the following operation. In addition, the third embodiment will be described assuming that transmission in a central gateway 2 is performed according to a CAN protocol.

When determining control contents of an own car based on sensor data, the add-on ECU 60 determines based on the sensor data whether to use an existing function or use an additional function since the existing function cannot support the control contents. In this regard, the existing function is a function mounted on a drive assist function of the drive assist ECU 10 and a drive assist function of the add-on ECU 60. Meanwhile, the additional function is a function which is mounted only on the drive assist function of the add-on ECU 60, and which is not mounted on the drive assist function of the drive assist ECU 10.

In this regard, both of the drive assist function of the drive assist ECU 10 and the drive assist function of the add-on ECU 60 are the same as those in the first embodiment described with reference to FIGS. 7 and 8. In this case, the add-on ECU 60 determines an emergency brake as control contents of the own car in the example illustrated in FIG. 7, and determines an emergency performed while turning the steering as control contents of the own car in the example illustrated in FIG. 8. Meanwhile, the drive assist function of the drive assist ECU 10 does not support steering control which is the additional function unlike the add-on ECU 60. Hence, the drive assist ECU 10 determines the emergency brake as control contents of the own car in both of the example illustrated in FIG. 7 and the example illustrated in FIG. 8. That is, the control contents of the own car determined by the drive assist ECU 10 and the add-on ECU 60 match in the example illustrated in FIG. 7, and the control contents of the own car determined by the drive assist ECU 10 and the add-on ECU 60 do not match in the example illustrated in FIG. 8.

Hence, for example, the add-on ECU 60 determines to use the existing function when the determined control contents of the own car include only a brake operation without a steering operation, and determines to use the additional function since the existing function cannot support the control contents when the determined control contents of the own car include a steering operation and include the brake operation, too. Further, the add-on ECU 60 sets determination result data indicating whether or not to use the existing function or use the additional function, as a determination result to a data field of a data frame including control data. Consequently, the filtering controller 50 can recognize whether to use the existing function or use the additional function.

According to the third embodiment, when it is determined to use the existing function, the filtering controller 50 compares control data from the drive assist ECU 10 and control data from the add-on ECU 60, so that it is possible to check validity of the control data. This is because it is expected in this case that these items of control data match.

(Configuration of Filtering Controller 50 According to Third Embodiment)

Figure 11:
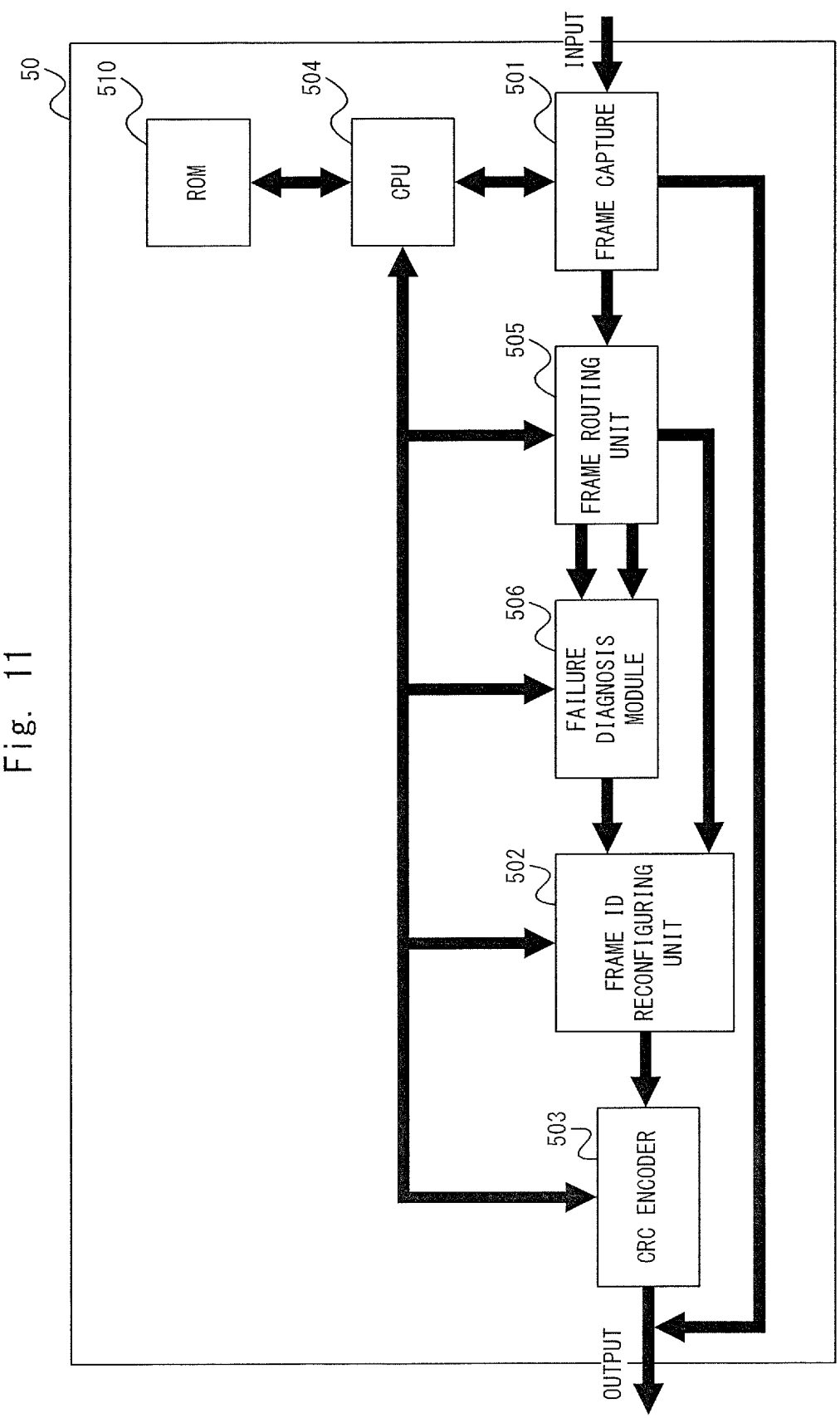
FIG. 11 is a view illustrating a configuration of a filtering controller according to a third embodiment.

Next, a configuration of a filtering controller 50 according to the third embodiment will be described with reference to FIG. 11. As illustrated in FIG. 11, upon comparison with the filtering controller 50 according to the first embodiment described with reference to FIG. 3, the filtering controller 50 further includes a frame routing unit 505 and a failure diagnosis module 506.

A frame capture 501 obtains a data frame including control data from the drive assist ECU 10 and a data frame including control data from the add-on ECU 60 yet transmits both of these data frames to the frame routing unit 505 without discarding the data frame from the drive assist ECU 10 in the third embodiment. Hence, in the third embodiment, frame ID data indicating a frame ID of the control data from the drive assist ECU 10 is stored as a frame ID used for comparison in the ROM 510 of the filtering controller 50 without discarding the frame ID.

The frame routing unit 505 determines whether to use the existing function (whether or not control data from the add-on ECU 60 is control data calculated by the existing function) or use the additional function (whether or not the control data from the add-on ECU 60 is control data calculated by the additional function). When it is determined to use the existing function, the frame routing unit 505 transmits both of a data frame from the drive assist ECU 10 and a data frame from the add-on ECU 60 to the failure diagnosis module 506.

More specifically, the frame routing unit 505 can make the determination based on determination result data included in the data frames together with the control data as described above. As described above, the add-on ECU 60 determines whether to use the existing function or use the additional function, and sets which function is used to calculate control data, to determination result data. In this regard, the add-on ECU 60 determines whether to use the existing function or use the additional function at a timing for calculating control data, based on sensor data obtained from a sensor domain 20, and sets this determination result to determination result data. Further, the frame routing unit 505 can determine whether to use the existing function and use the additional function by reading this determination result data.

The failure diagnosis module 506 compares the items of control data included in the data frames transmitted from the frame routing unit 505, and determines whether or not there is a difference between the items of control contents. Hence, the control data calculated by the drive assist ECU 10 by using the existing function and control data calculated by the add-on ECU 60 by using the existing function are compared. Hence, when a failure does not occur in the drive assist ECU 10 and the add-on ECU 60, and the both items of control data are normal, the both items of control data match.

In this regard, when, for example, control data is command-based data, control data which needs to be compared can be specified by specifying control data indicating the same type of a command as control data which needs to be compared. In this case, the control data indicates, for example, a control torque amount of a brake hydraulic pressure of a brake 422 and a turning angle of a steering 411 as command parameters. Hence, in this case, the failure diagnosis module 506 compares command parameters to compare the items of control data.

(Processing of Filtering Controller 50)

Figure 12:
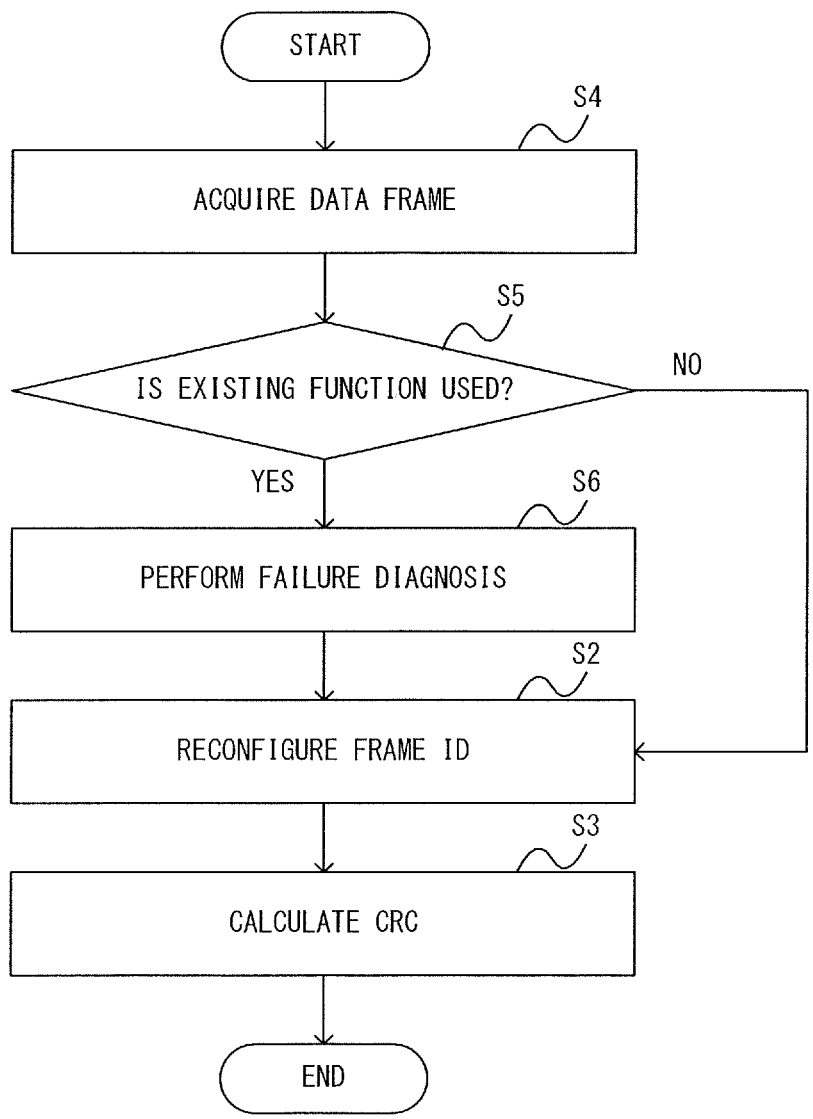
FIG. 12 is a flowchart illustrating processing of the filtering controller according to the third embodiment.

Next, processing of the filtering controller 50 according to the third embodiment will be described with reference to FIG. 12.

The processing illustrated in FIG. 12 differs from the processing in the first embodiment described with reference to FIG. 5 in including step S4 instead of step S1 and further including steps S5 and S6 at a subsequent stage of step S4.

Processing in step S4 differs from the processing in step S1 according to the first embodiment in defining a frame ID of control data from the drive assist ECU 10, too, as a frame ID of an acquisition target data frame which is not discarded. Hence, the frame capture 501 acquires data frames of the control data from the drive assist ECU 10 and control data from the add-on ECU 60, and outputs the data frames to the frame routing unit 505.

The frame routing unit 505 determines whether to use the existing function or use the additional function (S5). When the additional function is used (S5: No), the frame routing unit 505 does not output the data frame from the add-on ECU 60 (the data frame from the drive assist ECU 10, too) to the failure diagnosis module 506, and outputs the data frame from the add-on ECU 60 to the frame ID reconfiguring unit 502. Subsequently, similar to the first embodiment, a frame ID and a CRC of the control data from the add-on ECU 60 are changed, and the control data is transmitted as the control data from the drive assist ECU 10 to the control domains 30 and 40.

Meanwhile, when the existing function is used (S5: Yes), the frame routing unit 505 outputs both of the data frame from the drive assist ECU 10 and the data frame from the add-on ECU 60, to the failure diagnosis module 506.

The failure diagnosis module 506 performs failure diagnosis by comparing the items of control data included in the data frames outputted from the frame routing unit 505 (S6). The failure diagnosis module 506 compares the items of control data transmitted from the frame routing unit 505, and determines whether or not there is a difference between the items of control contents. In addition, strictly speaking, the items of control data included in data fields of the data frames are compared. The control data calculated by the drive assist ECU 10 by using the existing function and the control data calculated by the add-on ECU 60 by using the existing function are compared. Hence, when a failure does not occur in the drive assist ECU 10 and the add-on ECU 60, and the both items of control data are normal, the both items of control data match.

When determining that the items of control data match, the failure diagnosis module 506 outputs the data frame from the add-on ECU 60 to the frame ID reconfiguring unit 502. Subsequently, similar to the first embodiment, a frame ID and a CRC of the control data from the add-on ECU 60 are changed, and the control data is transmitted as the control data from the drive assist ECU 10 to the control domains 30 and 40.

Meanwhile, when the items of control data do not match, a failure of the drive assist ECU 10 occurs, a failure of the add-on ECU 60 occurs or a failure of a channel to the failure diagnosis module 506 occurs, and therefore at least one item of control data is abnormal. Hence, in this case, which control data is correct cannot be specified, so that the filtering controller 50 notifies a driver of an error and notifies the driver of that a failure is occurring in the drive assist network system 1, and transfers a control right of the own car to the driver.

In this regard, an arbitrary output device may notify (output) the driver of an error. The output device is, for example, a display device, an audio output device or a combination thereof. The display device may be, for example, a display panel which displays images indicating error notification contents, or may be a LED (Light Emitting Diode) which supports error notification. The audio output device is, for example, a speaker which outputs an error notification sound or a warning sound. The filtering controller 50 outputs an error from the output device when the items of control data do not match.

(Processing of Drive Assist Network System 1 According to Third Embodiment)

Figure 13:
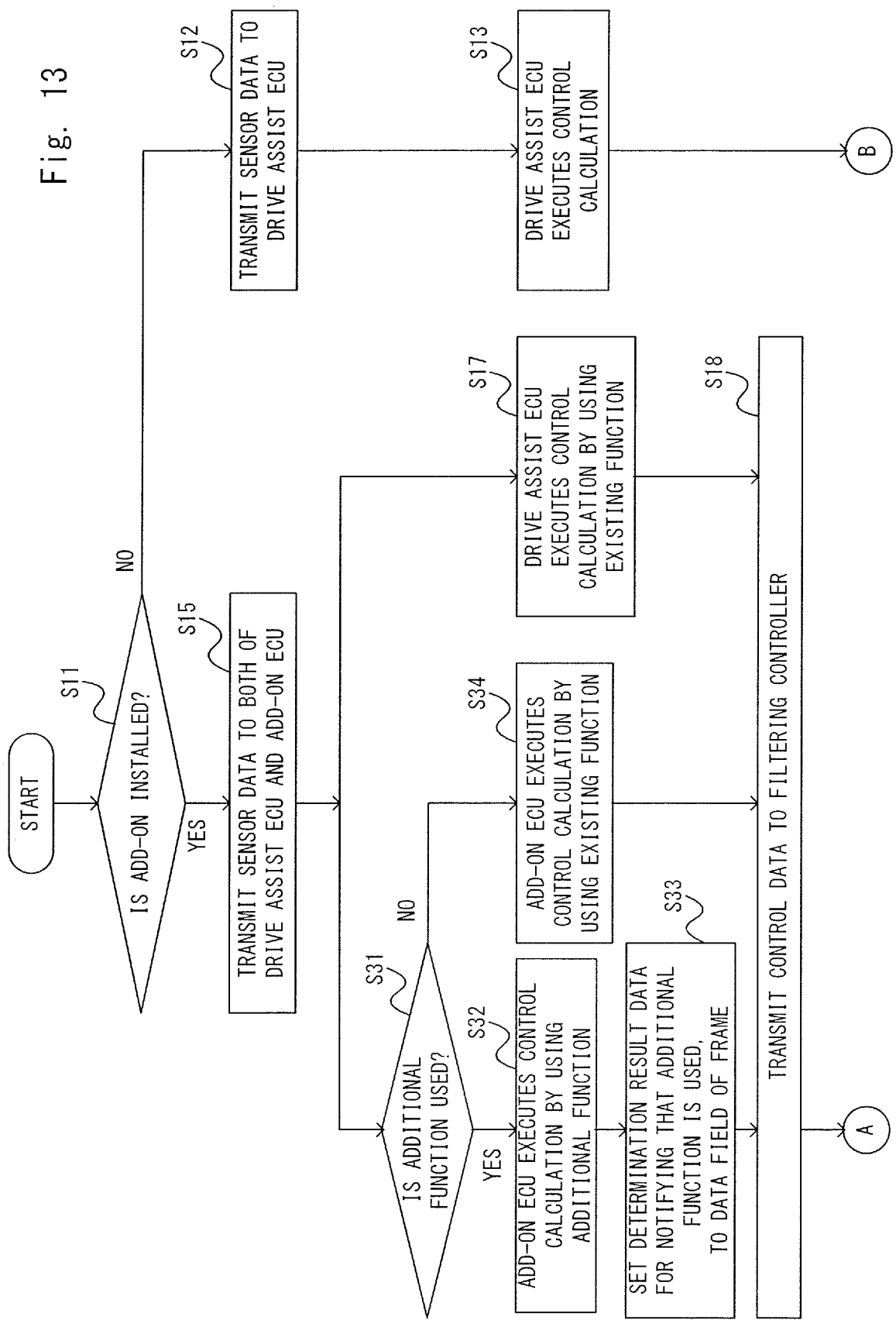
FIG. 13 is a flowchart (1/2) illustrating processing of a drive assist network system according to the third embodiment.
Figure 14:
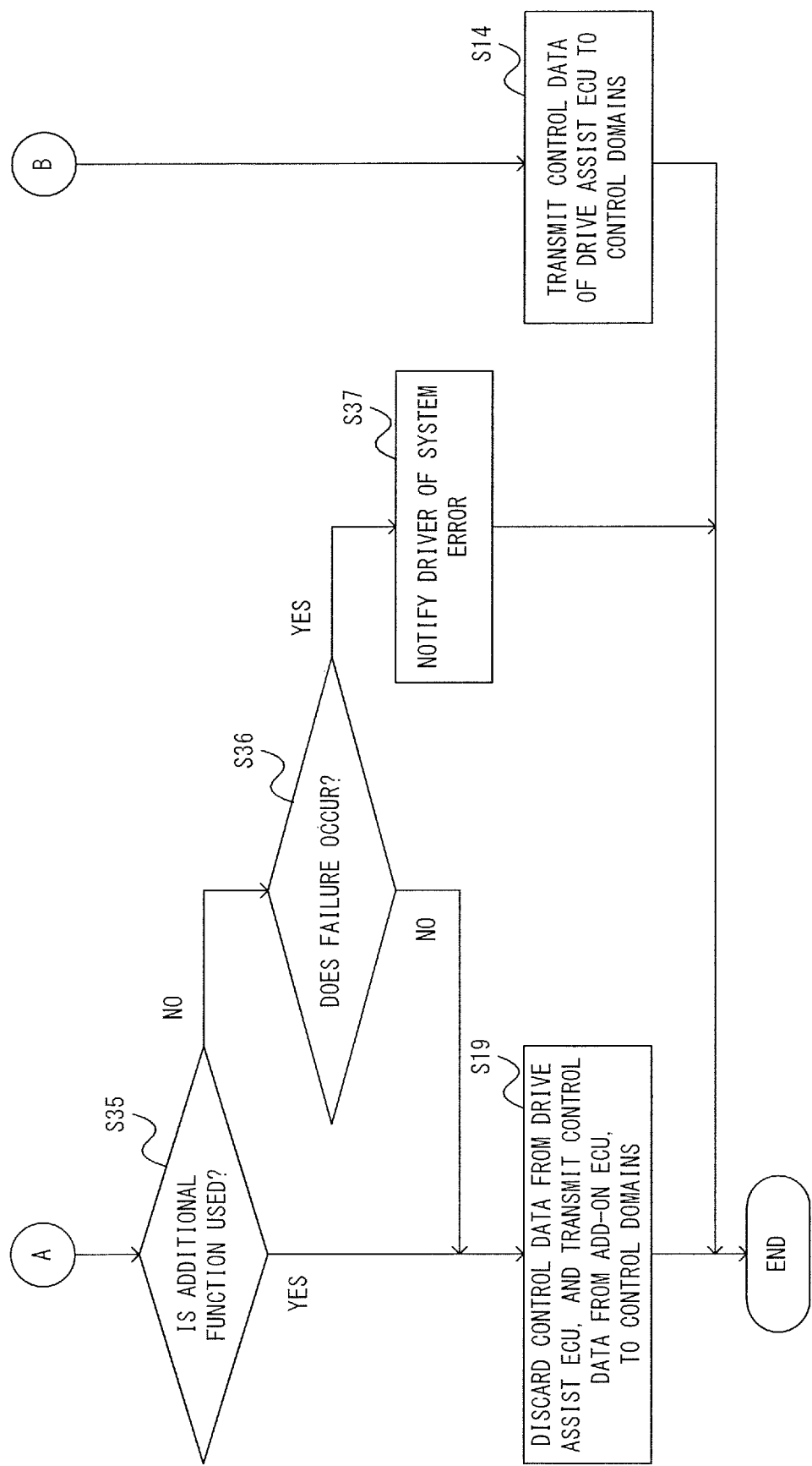
FIG. 14 is a flowchart (2/2) illustrating processing of the drive assist network system according to the third embodiment.

Next, processing of the drive assist network system 1 according to the third embodiment will be described with reference to FIGS. 13 and 14.

The processing illustrated in FIG. 13 differs from the processing in the first embodiment described with reference to FIG. 6 in including steps S31 to S34 instead of step S16 at a subsequent stage of step S15 and including steps S35 and S37 at the subsequent stage of step S18.

After step S15, the add-on ECU 60 determines whether to use the existing function or use the additional function (S31). When the additional function is used (S31: Yes), the add-on ECU 60 uses the additional function to calculate control data based on sensor data transmitted from the sensor domain 20 through the filtering controller 50, and sets determination result data indicating that the additional function is used, to a data field of a data frame of the control data (S32 and S33). Meanwhile, when it is determined to use the existing function (S31: No), the add-on ECU 60 uses the existing function to calculate control data based on sensor data transmitted from the sensor domain 20 through the filtering controller 50 (S34). In addition, processing of calculating control data in steps S32 and S34 is distinguished and described. However, both steps are substantially the same as step S16 in the first embodiment.

After step S18, the filtering controller 50 determines whether to use the existing function or use the additional function (S35). That is, the filtering controller 50 determines to use the additional function when the determination result data included in the data frame of the control data indicates that the additional function is used, and determines to use the existing function when the determination result data indicates that the existing function is used.

When determining to use the existing function (S35: No), the filtering controller 50 determines whether or not a failure occurs in one of the drive assist ECU 10 and the add-on ECU 60 (S36). That is, the filtering controller 50 compares the control data from the add-on ECU 60 and the control data from the drive assist ECU 10, and determines that a failure occurs in one of the drive assist ECU 10 and the add-on ECU 60 when these items of control data do not match. When determining that the failure occurs in one of the drive assist ECU 10 and the add-on ECU 60 occurs (S36: Yes), the filtering controller 50 transmits data notifying a driver of an error, to an output device (S37).

Meanwhile, when determining to use the additional function (S35: Yes), and when determining that a failure does not occur in both of the drive assist ECU 10 and the add-on ECU 60 (S36: No), the filtering controller 50 transmits the control data from the add-on ECU 60 as the control data from the drive assist ECU 10, to the control domains 30 and 40 (S19).

As described above, in the third embodiment, by further providing the frame routing unit 505 and the failure diagnosis module 506 to the filtering controller 50 of the drive assist network system 1 and making the drive assist ECU redundant, failure diagnosis is realized by comparing the outputs of the frame routing unit 505 and the failure diagnosis module 506. Consequently, it is possible to detect a failure of the drive assist ECU and notify the driver of an error and, consequently, improve function safety at a system level.

Fourth Embodiment

Figure 15:
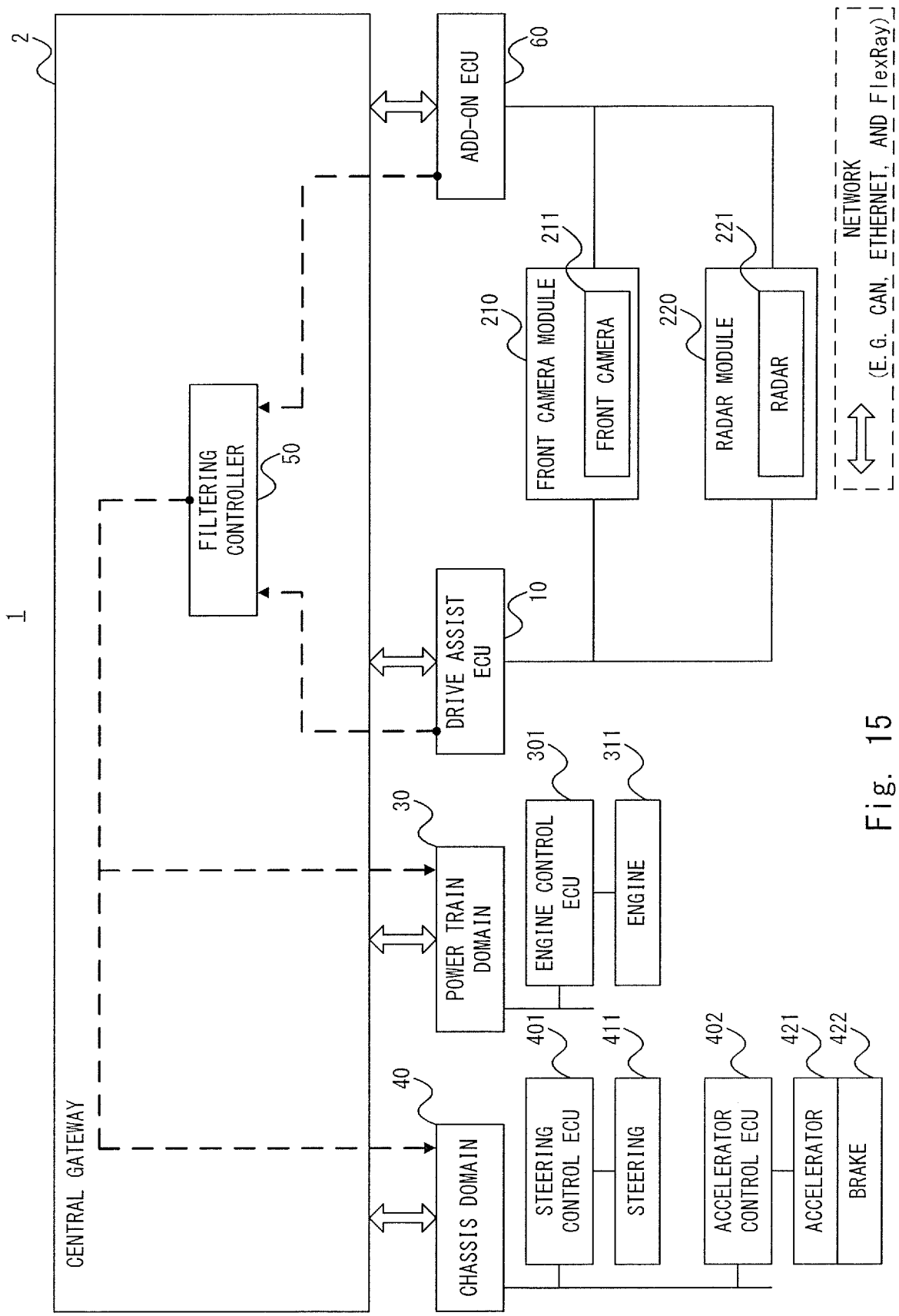
FIG. 15 is a view illustrating a configuration of a drive assist network system according to a fourth embodiment.

Next, the fourth embodiment will be described with reference to FIG. 15. The same contents as those in the first embodiment will be described below while optionally omitting the contents by assigning the same reference numerals. In addition, the fourth embodiment will be described assuming that the fourth embodiment is constructed based on the first embodiment, yet may be constructed based on the third embodiment.

In the first embodiment, sensor data is transmitted to a drive assist ECU 10 and an add-on ECU 60 through a central gateway 2. However, in the fourth embodiment, sensor data is transmitted to the drive assist ECU 10 and the add-on ECU 60 without using the central gateway 2. In this regard, when sensor data is transmitted as RAW data through the central gateway 2, the data amount of the sensor data is enormous, and therefore increases a traffic in the central gateway 2 and causes a crash of a bus band. Hence, although sensor data (or calculated distance data) subjected to primary processing is transmitted through the central gateway 2, this transmission cannot help but occupying a certain bus band. By contrast with this, by directly transmitting sensor data to the drive assist ECU 10 and the add-on ECU 60 without using the central gateway 2, it is possible to hedge such a situation.

(Configuration of Drive Assist Network System According to Fourth Embodiment)

A configuration of a drive assist network system 1 according to the fourth embodiment will be described with reference to FIG. 15. As illustrated in FIG. 15, the drive assist network system 1 according to the fourth embodiment differs from the drive assist network system 1 according to the first embodiment described with reference to FIG. 1 in including a front camera module 210 and a radar module 220 instead of a sensor domain 20 (a front camera ECU 201 and a radar ECU 202).

The front camera module 210, and the drive assist ECU 10 and the add-on ECU 60 are connected according to communication standards such as LVDS (Low Voltage Differential Signaling) or Ethernet (registered trademark) AVB. The radar module 220, and the drive assist ECU 10 and the add-on ECU 60 are connected according to communication standards such as a SPI (Serial Peripheral Interface).

The front camera module 210 transmits image data generated by the front camera 211 to the drive assist ECU 10 and the add-on ECU 60. The radar module 220 transmits measurement distance data generated by the radar 221, to the drive assist ECU 10 and the add-on ECU 60. That is, in the fourth embodiment, RAW data is transmitted as sensor data to the drive assist ECU 10 and the add-on ECU 60.

The drive assist ECU 10 and the add-on ECU 60 determine control contents of an own car based on the items of RAW data transmitted from the front camera module 210 and the radar module 220.

(Processing of Drive Assist Network System 1 According to Fourth Embodiment)

In addition, processing of the drive assist network system 1 according to the fourth embodiment is the same as the processing of the drive assist network system 1 according to the first embodiment described with reference to FIG. 6, and therefore will not be described.

Recently, an image recognition algorithm and a sensor Fusion technique make rapid advancement, and therefore it is possible to provide an advanced drive assist function by adopting a newer image recognition algorithm and sensor Fusion technique in the add-on ECU 60.

According to the fourth embodiment, it is possible to construct a system which can catch up with advancement of the image recognition algorithm and the sensor Fusion technique. When, for example, the front camera ECU 201 and the radar ECU 202 are mounted as in the drive assist network system 1 according to the first embodiment and primary processing is performed, not only the drive assist ECU 10 and the add-on ECU 60 but also the primary processing of the front camera ECU 201 and the radar ECU 202 need to be changed in response to advancement of the image recognition algorithm and the sensor Fusion technique. By contrast with this, according to the fourth embodiment, by mounting the add-on ECU 60 which adopts the new image recognition algorithm and sensor Fusion technique, it is possible to catch up with the advancement of the image recognition algorithm and the sensor Fusion technique.

Modified Example of Fourth Embodiment

A case where a front camera module 210 and a radar module 220 transmit items of RAW data to a drive assist ECU 10 and an add-on ECU 60 has been described above. However, the present invention is not limited to this. For example, the front camera module 210 and the radar module 220 may perform primary processing on image data and measurement distance data similar to a front camera ECU 201 and a radar ECU 202, and transmit object data and calculated distance data to the drive assist ECU 10 and the add-on ECU 60.

Further, even in this case, the front camera module 210 and the radar module 220 are not limited to generation of the completely same object data and calculated distance data as those of the front camera ECU 201 and the radar ECU 202. The front camera module 210 and the radar module 220 may generate intermediate data closer to RAW data as the object data and the calculated distance data. For example, disparity data obtained from a stereo camera or flow vector information (optical flow) may be generated as the intermediate data of the image data and the object data.

Fifth Embodiment

Next, the fifth embodiment will be described. The same contents as those in the first embodiment will be described below while optionally omitting the contents by assigning the same reference numerals. In addition, the fifth embodiment will be described assuming that the fifth embodiment is constructed based on the first embodiment. However, the fifth embodiment is not limited to this, and can also be constructed based on one of the second to fourth embodiments.

Contends described in the first to fourth embodiments are applicable to a system other than an in-vehicle system as long as the system employs a central gateway configuration and performs "recognition, determination and control" as a basic operation. In the fifth embodiment, a case where the above contents are applied to an intelligent robot 3 will be described as a first application example. A basic configuration of the intelligent robot 3 employs a configuration of "recognition, determination and control" and is the same as the basic configuration of an in-vehicle drive assist network system 1.

(Configuration of Intelligent Robot 3 According to Fifth Embodiment)

Figure 16:
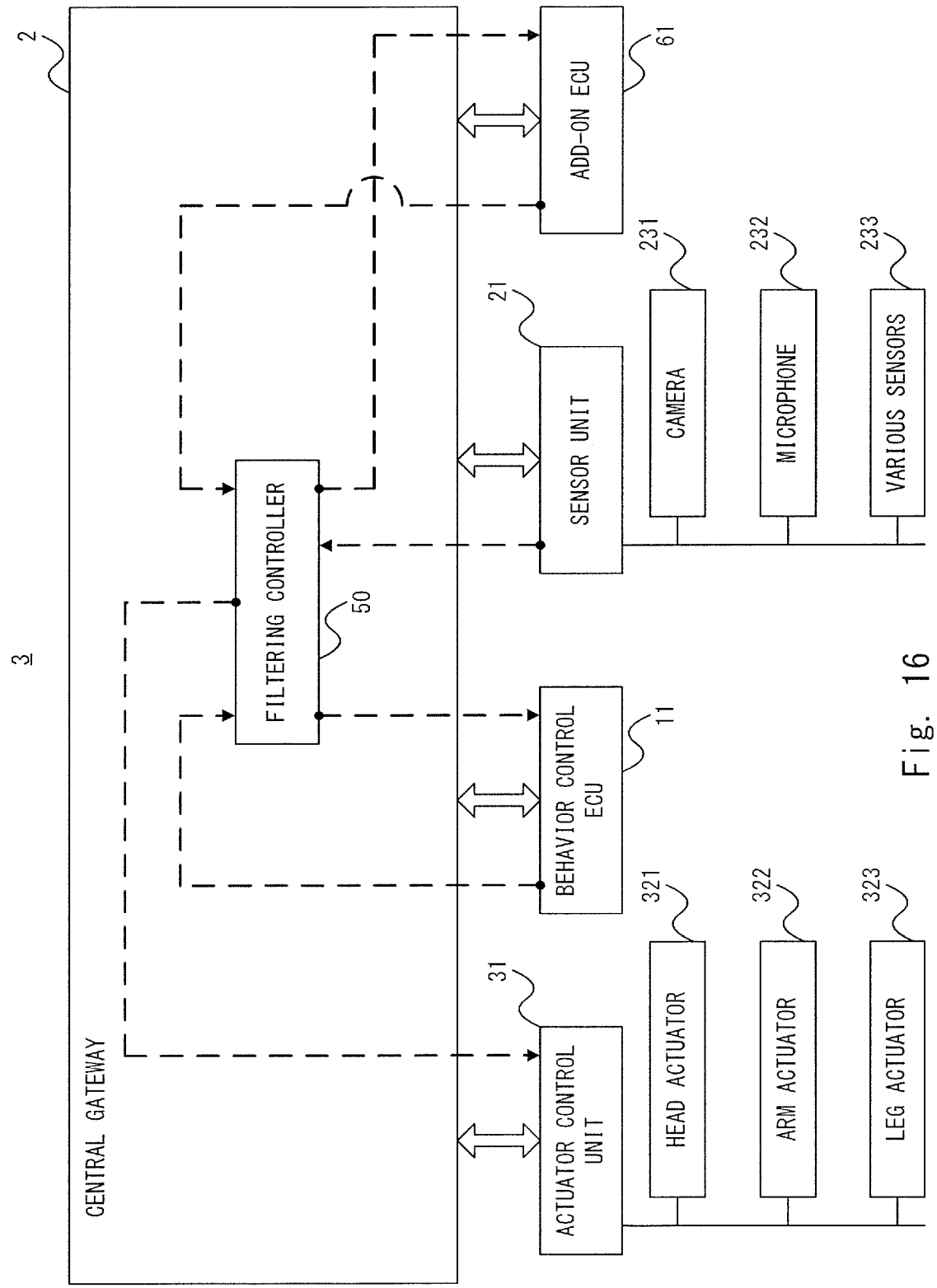
FIG. 16 is a view illustrating a configuration of an intelligent robot according to a fifth embodiment.

A configuration of the intelligent robot 3 according to the fifth embodiment will be described with reference to FIG. 16. As illustrated in FIG. 16, the intelligent robot 3 according to the fifth embodiment includes a central gateway 2, a behavior control ECU 11, a sensor unit 21, an actuator control unit 31, a filtering controller 50 and an add-on ECU 61.

The behavior control ECU 11 differs from a drive assist ECU 10 according to the first embodiment in calculating control data indicating control contents of actuators 321 to 323 of the intelligent robot 3 instead of calculating control data of a car based on sensor data. The behavior control ECU 11 transmits the generated control data to the actuator control unit 31 through the central gateway 2 (filtering controller 50).

The sensor unit 21 includes a camera 231, a microphone (also referred to as a "microphone" below) 232 and various sensors 233. The sensor unit 21 performs primary processing on items of data transmitted from the camera 231, the microphone 232 and the various sensors 233, and transmits the items of data as items of sensor data to the behavior control ECU 11 and the add-on ECU 61 through the central gateway 2 (filtering controller 50).

The camera 231 captures an image of the surroundings of the intelligent robot 3. The camera 231 generates image data indicating the image of the surroundings of the intelligent robot 3 by capturing the image of the surroundings of the intelligent robot 3, and transmits the image data to the sensor unit 21.

The microphone 232 receives an input of an audio in the surroundings of the intelligent robot 3. The microphone 232 generates audio data indicating an inputted audio, and transmits the audio data to the sensor unit 21.

The various sensors 233 detect other contents of the intelligent robot 3. That is, at least one sensor which detects arbitrary contents other than an image and an audio may be provided to the intelligent robot 3. For example, as the various sensors 233, a radar which measures a distance between the surroundings of the intelligent robot 3 and an obstacle may be provided to the intelligent robot 3, and a rotary encoder which detects a rotary angle of each of the actuators 321 to 323 of the intellectual robot 3 may be provided to the intellectual robot 3. The various sensors 233 generate data indicating the detected contents, and transmits the data to the sensor unit 21.

The actuator control unit 31 includes the head actuator 321, the arm actuator 322 and the leg actuator 323. The actuator control unit 31 controls each of the actuators 321 to 323 based on control data transmitted from the behavior control ECU 11 and the add-on ECU 61.

The head actuator 321 is an actuator which is provided to a head of the intelligent robot 3. The actuator control unit 31 drives the head actuator 321 to turn the head of the intelligent robot 3.

The arm actuator 322 is an actuator which is provided to the arm of the intelligent robot 3. The actuator control unit 31 drives the arm actuator 322 to operate an arm of the intelligent robot 3. Consequently, for example, the intelligent robot 3 can grab and carry an object in the surroundings. The intelligent robot 3 has, for example, the arm actuator 322 at each joint of the arm.

The leg actuator 323 is an actuator which is provided to a leg of the intellectual robot 3. The actuator control unit 31 drives the leg actuator 323, so that the intelligent robot 3 walks. The intelligent robot 3 has, for example, the leg actuator 323 at each joint of the leg. Further, the leg actuator 323 is not limited to this. For example, the intelligent robot 3 may be a robot which runs using wheels instead of a walking robot. In this case, the leg actuator 323 is an actuator which drives the wheels to rotate.

The add-on ECU 61 differs from an add-on ECU 60 according to the first embodiment in calculating control data indicating control contents of the actuators 321 to 323 of the intelligent robot 3 instead of calculating control data of the car based on sensor data. The add-on ECU 61 transmits the generated control data to the actuator control unit 31 through the central gateway 2 (filtering controller 50).

(Processing of Intelligent Robot 3 According to Fifth Embodiment)

In addition, processing of the intelligent robot 3 according to the fifth embodiment is the same as the processing of the drive assist network system. 1 according to the first embodiment described with reference to FIG. 6, and therefore will not be described. That is, according the processing of the drive assist network system 1 according to the first embodiment, a drive assist ECU 10 is replaced with the behavior control ECU 11, and the add-on ECU 60 is replaced with the add-on ECU 61.

The behavior control ECU 11 corresponds to a brain in terms of a person, and has very high arithmetic operation performance and therefore can perform more advanced control. This arithmetic operation performance is proportional to development of a semiconductor process and an increase in a speed of the frequency, and therefore develops very fast. However, the sensor unit 21 and the actuator control unit 31 are developed slower than the behavior control ECU 11. In view of such a background, the behavior control ECU 11 having high arithmetic operation performance is necessary to cause the intelligent robot 3 created first to perform a more advanced operation.

By contrast with this, according to the fifth embodiment described above, by additionally mounting a behavior control ECU which has high arithmetic operation performance and on which a new function is mounted as the add-on ECU 61 which is an add-on behavior control ECU, the add-on ECU 61 instead of the existing behavior control ECU 11 can control the intelligent robot 3 without changing control contents of other blocks. Consequently, it is possible to improve the functions of the intelligent robot 3.

Thus, an application target of the drive assist network system 1 according to the first to fourth embodiments is not limited to a car alone, and is applicable to a moving object such as a car, a robot or an inverted two-wheel which moves under control of the drive assist network system 1.

Sixth Embodiment

Next, the sixth embodiment will be described. The same contents as those in the first embodiment will be described below while optionally omitting the contents by assigning the same reference numerals. In addition, the sixth embodiment will be described assuming that the sixth embodiment is constructed based on the first embodiment. However, the sixth embodiment is not limited to this, and can also be constructed based on one of the second to fourth embodiments.

In the sixth embodiment, a case where a system is applied to "Internet of Things" in cloud business will be described as a second application example to a system than an in-vehicle system. "Internet of Things" also perform "recognition, determination and control" as a basic operation. Further, in the sixth embodiment, a rise warning system 4 for a river will be described as a specific example of the "Internet of Things".

When there is a great amount of rain such as torrential rain in mountains, the rain from the mountains concentrates and flows to a river, and then a rapid rise in a river water level endangers people playing near the mouth of the river. The rise warning system 4 determines a rapid rise in this river water level and the amount of rainfall based on data of sensors installed at the mountains and the river, and predicts the river water level. If a dangerous rise in the water level is predicted, a warning device installed at the amount of the river is activated. Consequently, people at the mount of the river can safely evacuate.

(Configuration of Warning System 4 According to Sixth Embodiment)

Figure 17:
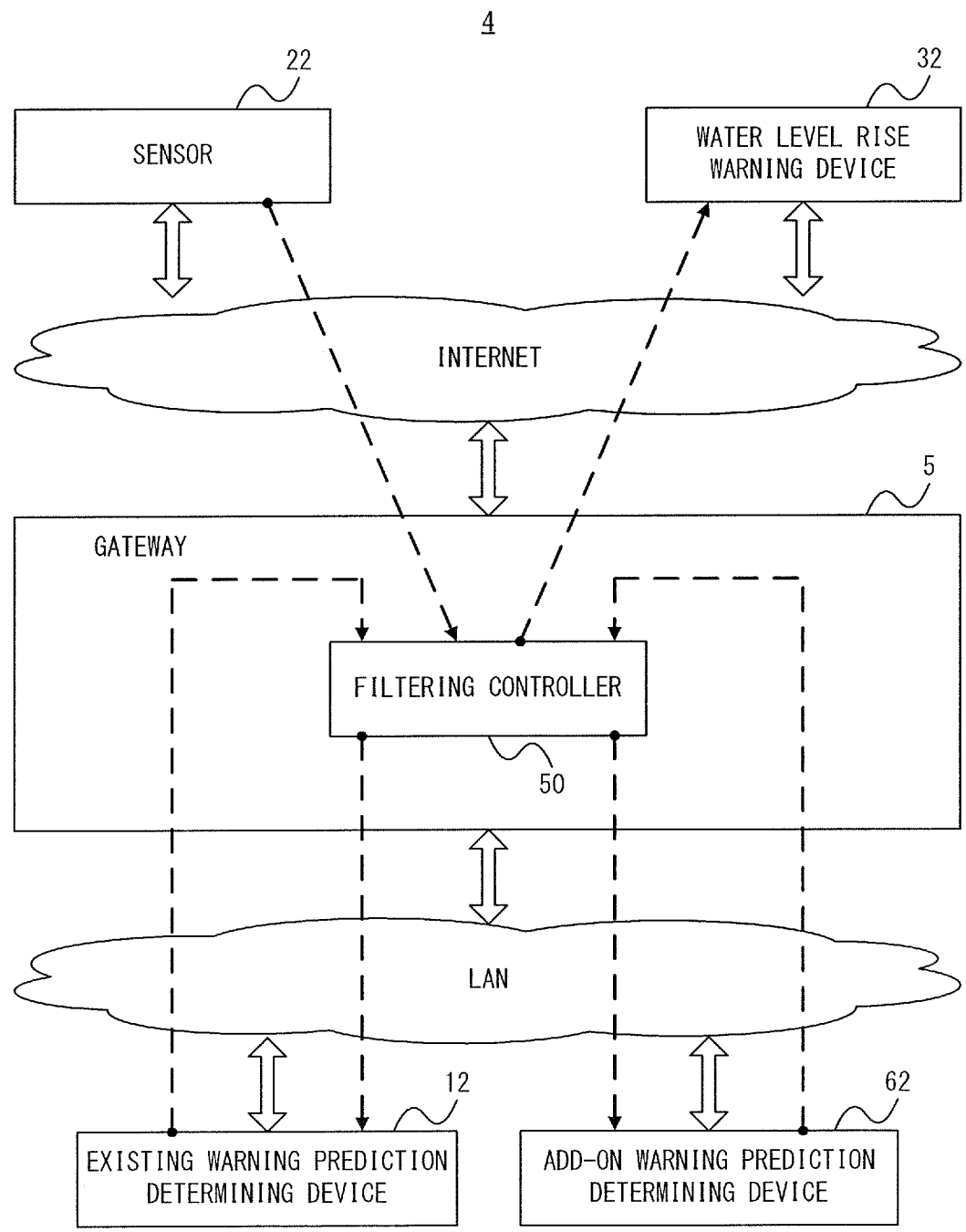
FIG. 17 is a view illustrating a configuration of a rise warning system according to a sixth embodiment.

A configuration of the rise warning system 4 according to the sixth embodiment will be described with reference to FIG. 17. As illustrated in FIG. 17, the rise warning system 4 according to the sixth embodiment includes a gateway 5, an existing warning prediction determining device 12, a sensor 22, a water level rise warning device 32 and an add-on warning prediction determining device 62.

The gateway 5 includes a filtering controller 50, and performs the same operation as that of a central gateway 2 according to the first embodiment. In this regard, in the sixth embodiment, the gateway 5 corresponds to a gateway which relays data transmitted and received between a first network connected with the sensor 22 and the water level rise warning device 32 and a second network connected with the existing warning prediction determining device 12 and the add-on warning prediction determining device 62. For example, the first network is the Internet, and the second network is a LAN (Local Area Network).

The existing warning prediction determining device 12 differs from a drive assist ECU 10 according to the first embodiment in calculating control data indicating control contents of the water level rise warning device 32 based on sensor data from the sensor 22 instead of calculating control data of a car based on sensor data. The existing warning prediction determining device 12 transmits the generated control data to the water level rise warning device 32 through the gateway 5 (filtering controller 50). The existing warning prediction determining device 12 is, for example, a server or a supercomputer.

The sensor 22 is a water level sensor which measures a rainfall amount sensor which measures a rainfall amount or a water level sensor which measures a river water level. The sensor 22 generates rainfall amount data indicating the measured rainfall amount or water level data indicating the measured river water level, and transmits the rainfall amount data or the river water level data as sensor data to the existing warning prediction determining device 12 and the add-on warning prediction determining device 62 through the gateway 5 (filtering controller 50).

The water level rise warning device 32 notifies users of a danger of a river based on control data transmitted from the existing warning prediction determining device 12 and the add-on warning prediction determining device 62. The water level rise warning device 32 includes at least one of a siren, an electric message board and a flashing light, and notifies users of a danger of a river thereby. When the water level rise warning device 32 includes a siren, control data is data for indicating a siren rumbling operation. When the water level rise warning device 32 includes the electric message board, control data is data for instructing an indication on an electronic message board. In this case, the control data may include data of characters to be displayed on the electric message board. When the water level rise warning device 32 includes a flashing light, the control data is data for instructing an operation of the flashing light.

The add-on warning prediction determining device 62 differs from the add-on ECU 60 according to the first embodiment in calculating control data indicating control contents of the water level rise warning device 32 based on sensor data from the sensor 22 instead of calculating control data of the car based on the sensor data. The add-on warning prediction determining device 62 transmits the generated control data to the water level rise warning device 32 through the gateway 5 (filtering controller 50). The add-on warning prediction determining device 62 is, for example, a server or a supercomputer.

(Processing of Rise Warning System 4 According to Sixth Embodiment)

In addition, processing of the rise warning system 4 according to the sixth embodiment is the same as the processing of a drive assist network system 1 according to the first embodiment described with reference to FIG. 6, and therefore will not be described. That is, in the processing of the drive assist network system 1 according to the first embodiment, the drive assist ECU 10 is replaced with the existing warning prediction determining device 12, and the add-on ECU 60 is replaced with the add-on warning prediction determining device 62.

The rise warning system 4 can be also configured to model sensor data, predict and determine a phenomenon which occurs next while analyzing and learning the sensor data, and perform control. In this case, an element of the rise warning system 4 which performs analysis, learning, prediction and determination is an important function, and is required to have very high arithmetic operation performance. By contrast with this, according to the sixth embodiment, by mounting the latest server or supercomputer on which advanced arithmetic operation performance is mounted as the add-on warning prediction determine device 62, it is possible to improve the function of the rise warning system 4 without changing an existing portion (a portion which collects data, gives a command and performs control).

Even when, for example, a new water level prediction determining algorithm is devised, if arithmetic operation processing cannot catch up and cannot be performed quickly due to restriction of hardware of the existing warning prediction determining device 12, it is possible to upgrade a function without influencing the existing function by adding the add-on warning prediction determining device 62 having higher arithmetic operation processing performance than that of the existing warning prediction determining device 12.

Further, according to the sixth embodiment, when the add-on warning prediction determining device 62 detects a failure in the add-on warning prediction determining device 62, a failure may be notified to the filtering controller 50. Further, when notified of a failure from the add-on warning prediction determining device 62, the filtering controller 50 may disable the add-on warning prediction determining device 62 and enable the existing warning prediction determining device 12. Thus, the filtering controller 50 may monitor a failure state of the add-on warning prediction determining device 62.

In addition, the existing warning prediction determining device 12 and the add-on warning prediction determining device 62 which are installed at the LAN yet are not limited to these. For example, each of the existing warning prediction determining device 12 and the add-on warning determining device 62 may be a blade (board server) mounted on a blade server instead of an individual housing. Further, the gateway 5 may be not only another housing but also a blade (board server) mounted on the gateway 5.

Seventh Embodiment

Next, the seventh embodiment will be described. The same contents as those in the third embodiment will be described below while optionally omitting the contents by assigning the same reference numerals. In addition, the seventh embodiment will be described assuming that the seventh embodiment is constructed based on the third embodiment. However, the seventh embodiment can be also constructed based on one of the fourth to sixth embodiments.

In the seventh embodiment, a mode of using functions of OBDs (On-Board-Diagnostics) when the OBDs are mounted on a drive assist ECU 10 and an add-on ECU 60 will be described. In the third embodiment, a filtering controller 50 detects a failure by comparing items of control data, and performs processing matching the failure. However, in the sixth embodiment, processing is performed according to results of the OBDs of the drive assist ECU 10 and the add-on ECU 60.

(Configuration of Drive Assist Network System 1 According to Seventh Embodiment)

A configuration of a drive assist network system 1 according to the seventh embodiment is the same as the configuration of the drive assist network system 1 according to the third embodiment. However, the drive assist network system 1 according to the seventh embodiment differs from the drive assist network system 1 according to the third embodiment in the following operation.

The drive assist ECU 10 and the add-on ECU 60 respectively have the OBD functions. That is, the drive assist ECU 10 and the add-on ECU 60 have failure self-diagnosis functions, and diagnose failures in the drive assist ECU 10 and the add-on ECU 60. In addition, according to this failure diagnosis, any item may be diagnosed as long as failures in the drive assist ECU 10 and the add-on ECU 60 can be detected. For example, the drive assist ECU 10 and the add-on ECU 60 may detect any abnormality among various types of abnormalities such as a voltage abnormality and a clock abnormality. When detecting failures in the drive assist ECU 10 and the add-on ECU 60, the drive assist ECU 10 and the add-on ECU 60 transmit failure notification data for notifying the failures in the drive assist ECU 10 and the add-on ECU 60, to the filtering controller 50.

(Configuration of Filtering Controller 50 According to Seventh Embodiment)

Figure 18:
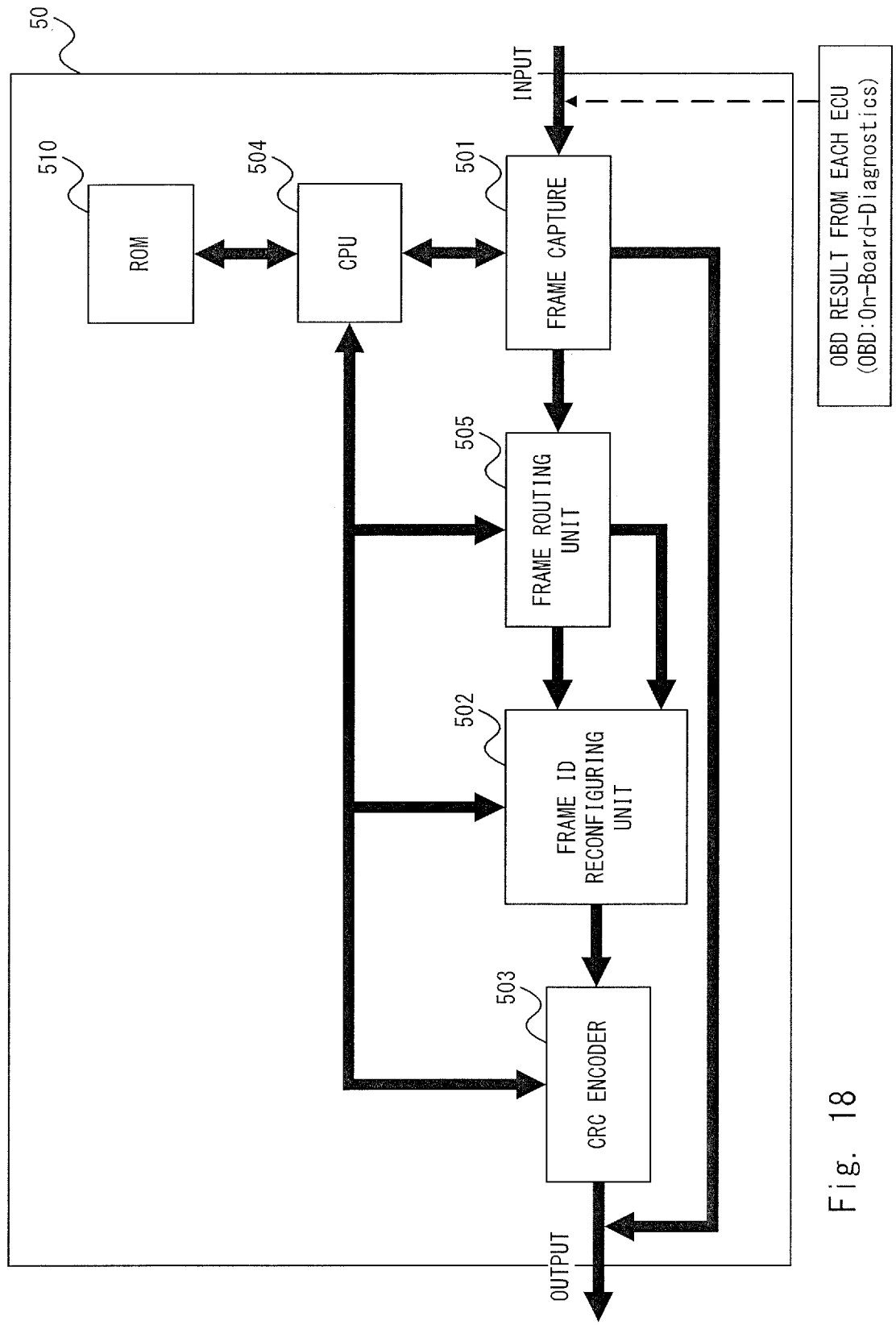
FIG. 18 is a view illustrating a configuration of a filtering controller according to a seventh embodiment.

Next, a configuration of the filtering controller 50 according to the seventh embodiment will be described with reference to FIG. 18. As illustrated in FIG. 18, the filtering controller 50 differs from the filtering controller 50 according to the third embodiment described with reference to FIG. 11 in not including a failure diagnosis module 506.

A frame capture 501 acquires items of failure notification data transmitted from the drive assist ECU 10 and the add-on ECU 60. When the frame capture 501 acquires the items of failure notification data, the frame routing unit 505 prevents transmission of the control data from the drive assist ECU 10 or the add-on ECU 60 which has transmitted the failure notification data, and notifies a driver of an error. An error notifying method is the same as that of the third embodiment, and therefore will not be described.

(Processing of Drive Assist Network System 1 According to Seventh Embodiment)

Figure 19:
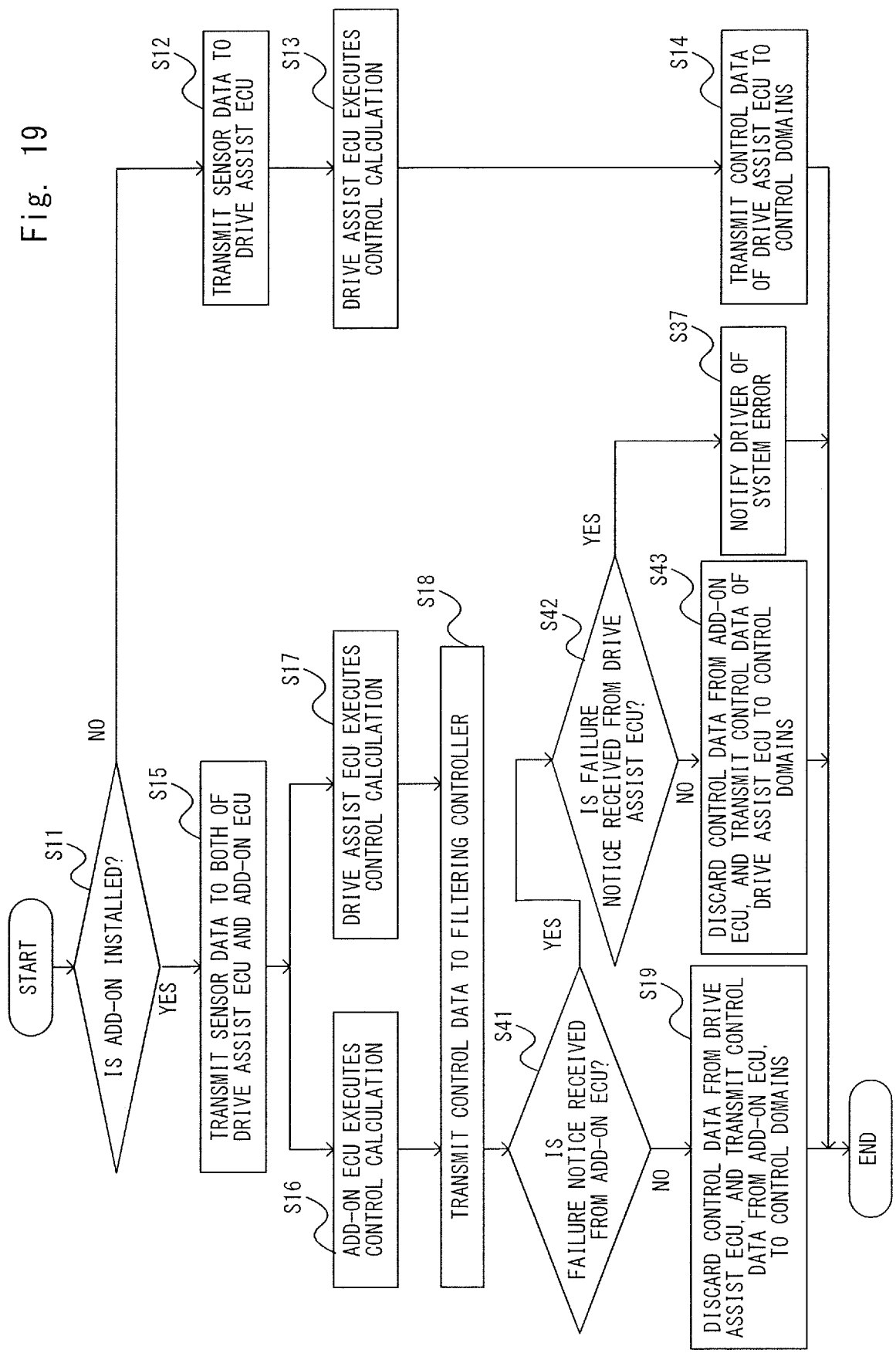
FIG. 19 is a flowchart illustrating processing of a drive assist network system according to a seventh embodiment.

Next, processing of the drive assist network system 1 according to the seventh embodiment will be described with reference to FIG. 19.

The processing illustrated in FIG. 19 differs from the processing in the third embodiment described with reference to FIGS. 13 and 14 in including step S16 at a subsequent stage of step S15 instead of steps S31 to 34, and including steps S41 to S43 at a subsequent stage of step S18 instead of steps S35 and 36.

After step S18, the filtering controller 50 determines whether or not the failure notification data is received from the add-on ECU 60 (S41). When the failure notification data is not received from the add-on ECU 60 (S41: No), step S19 is executed. Meanwhile, when the failure notification data is received from the add-on ECU 60 (S41: Yes), the filtering controller 50 determines whether or not the failure notification data is received from the drive assist ECU 10 (S42).

When the failure notification data is not received from the drive assist ECU 10 (S42: No), the filtering controller 50 discards the control data from the add-on ECU 60, and transmits the control data from the drive assist ECU 10, to control domains 30 and 40 (S43). In this case, even when a frame ID reconfiguring unit 502 reconfigures a frame ID, a frame ID of a data frame does not change and does not matter. However, preferably, the frame ID reconfiguring unit 502 does not reconfigure a frame ID so as not to execute extra processing. When the failure notification data is received from the drive assist ECU 10 (S42: Yes), step S37 is executed. In addition, the drive assist ECU 10 can also continue control when the control data from the drive assist ECU 10 is transmitted to the control domains 30 and 40 in step S43. However, there is a notification of a failure from the add-on ECU 60, and therefore, an error may be notified in the same way as in step S37.

As described above, according to the seventh embodiment, in which ECU a failure occurs can be specified based on an OBD result, so that it is possible to realize a minimum continuous operation.

Eighth Embodiment

Next, the eighth embodiment will be described. The same contents as those in the third embodiment will be described below while optionally omitting the contents by assigning the same reference numerals. In addition, the eighth embodiment will be described assuming that the eighth embodiment is constructed based on the third embodiment. However, the eighth embodiment can be also constructed based on one of the fourth to sixth embodiments.

In the third embodiment, an example where a drive assist network system 1 includes one add-on ECU has been described. However, a plurality of add-on ECUs may be provided. In the eighth embodiment, an example where a plurality of add-on ECUs are provided will be described.

(Configuration of Drive Assist Network System 1 According to Eighth Embodiment)

Figure 20:
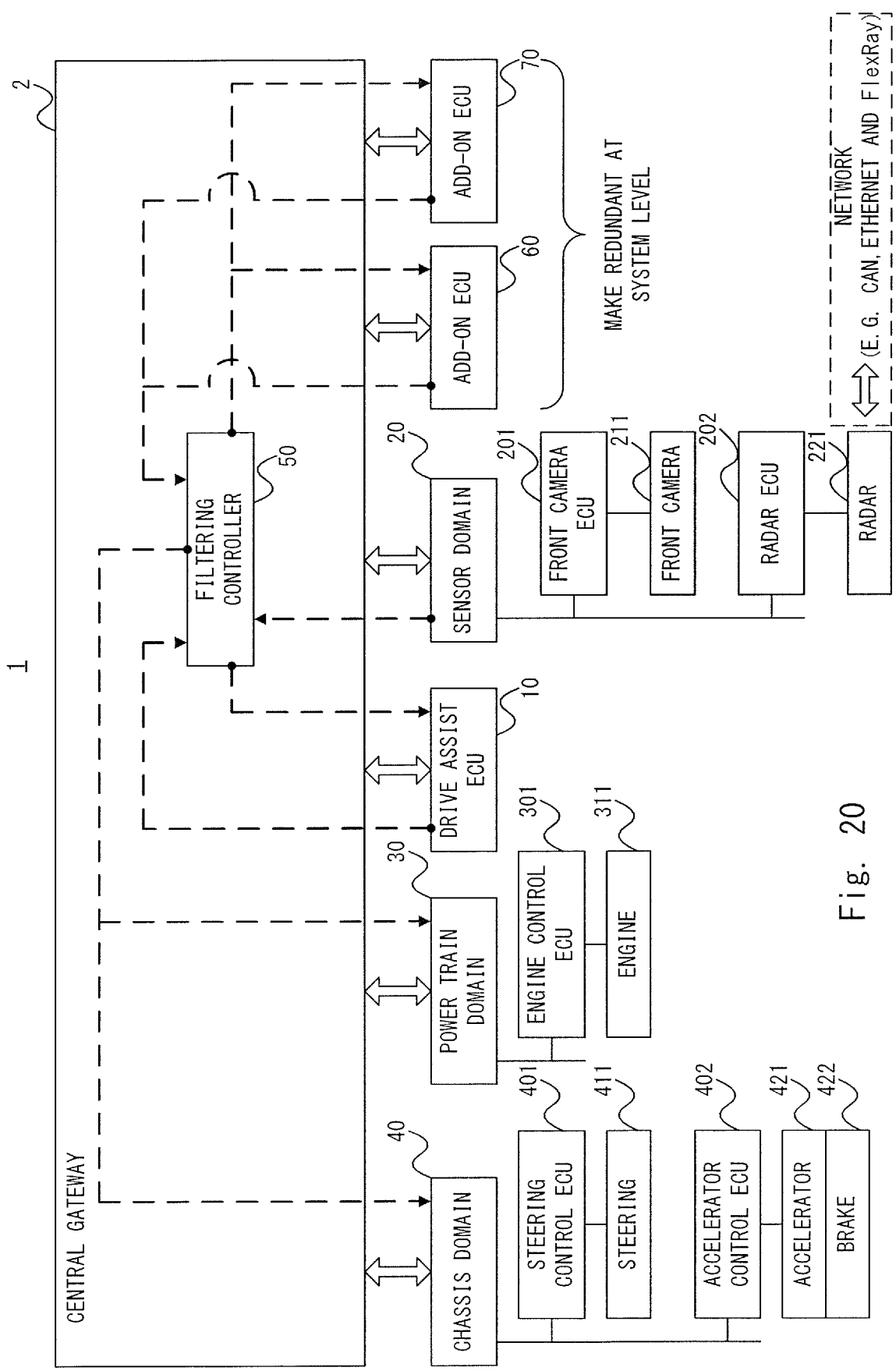
FIG. 20 is a view illustrating a configuration of a drive assist network system according to an eighth embodiment.

A configuration of the drive assist network system 1 according to the eighth embodiment will be described with reference to FIG. 20. As illustrated in FIG. 20, the drive assist network system 1 according to the third embodiment differs from the drive assist network system 1 according to the third embodiment in further including an add-on ECU 70. The add-on ECU 70 is a drive assist ECU whose configuration and operation are the completely same as those of the add-on ECU 60.

Hence, in the eighth embodiment, sensor data from a sensor domain 20 is transmitted to a drive assist ECU 10 and an add-on ECU 60 and, in addition, to the add-on ECU 70, too. The add-on ECU 70 transmits control data generated based on the sensor data, to a power train domain 30 and a chassis domain 40 through a filtering controller 50.

(Configuration of Filtering Controller 50 According to Eighth Embodiment)

A configuration of the filtering controller 50 according to the eighth embodiment is the same as the configuration of the filtering controller 50 according to the third embodiment. However, the filtering controller 50 according to the eighth embodiment differs from the filtering controller 50 according to the third embodiment in the following operation.

A frame capture 501 differs from the frame capture 501 according to the third embodiment in acquiring a data frame including control data from the drive assist ECU 10 and a data frame including control data from the add-on ECU 60 and, in addition, a data frame including control data from the add-on ECU 70, and transmits the data frames to a frame routing unit 505.

Hence, a CPU 504 notifies the frame capture 501 of a frame ID of the control data from the add-on ECU 70, too, as a frame ID of a data frame acquired to use for data comparison performed upon failure diagnosis. That is, in a ROM 510 included in the filtering controller 50, frame ID data indicating the control data from the add-on ECU 70 is also stored in advance as a frame ID of a data frame used for comparison. Thus, the frame capture 501 acquires the data frame from the add-on ECU 70, too, based on frame ID data acquired by the CPU 504 from the ROM 510 and transmitted, and transmits the data frame to the frame routing unit 505.

When determining to use an additional function based on determination result data included in the data frames from the add-on ECUs 60 and 70, the frame routing unit 505 transmits the data frame from the add-on ECU 60 and the data frame from the add-on ECU 70 to the failure diagnosis module 506. Meanwhile, when determining to use an existing function based on the determination result data included in the data frames from the add-on ECUs 60 and 70, the frame routing unit 505 transmits all of the data frame from the drive assist ECU 10, the data frame from the add-on ECU 60 and the data frame from the add-on ECU 70, to a failure diagnosis module 506. In addition, the frame routing unit 505 may refer to only determination result data included in one of the data frames from the add-on ECUs 60 and 70, and determine whether to use the additional function or use the existing function.

The failure diagnosis module 506 compares the items of control data included in the data frames transmitted from the frame routing unit 505. Hence, when the items of control data from the add-on ECUs 60 and 70 are the items of control data calculated by the additional function, the failure diagnosis module 506 compares the control data from the add-on ECU 60 and the control data from the add-on ECU 70. When the items of control data match, the failure diagnosis module 506 transmits one of the data frame of the add-on ECU 60 and the data frame from the add-on ECU 70 to the frame ID reconfiguring unit 502. When the items of control data do not match, an error is notified to a driver. The error notifying method is the same as that in the third embodiment, and therefore will not be described.

Meanwhile, when the items of control data from the add-on ECUs 60 and 70 are the items of control data determined by the existing function, the failure diagnosis module 506 performs tripartite comparison between the control data from the drive assist ECU 10, the control data from the add-on ECU 60 and the control data from the add-on ECU 70. When the items of control data match, the failure diagnosis module 506 transmits one of the data frame from the add-on ECU 60 and the data frame from the add-on ECU 70, to a frame ID reconfiguring unit 502. When two items of the items of control data do not match, the failure diagnosis module 506 transmits one of the two data frames whose failures have not been specified by the tripartite comparison, to the frame ID reconfiguring unit 502. That is, consequently, control data whose normality has been determined by a majority vote is transmitted to a transmission destination.

(Processing of Drive Assist Network System 1 According to Eighth Embodiment)

Figure 21:
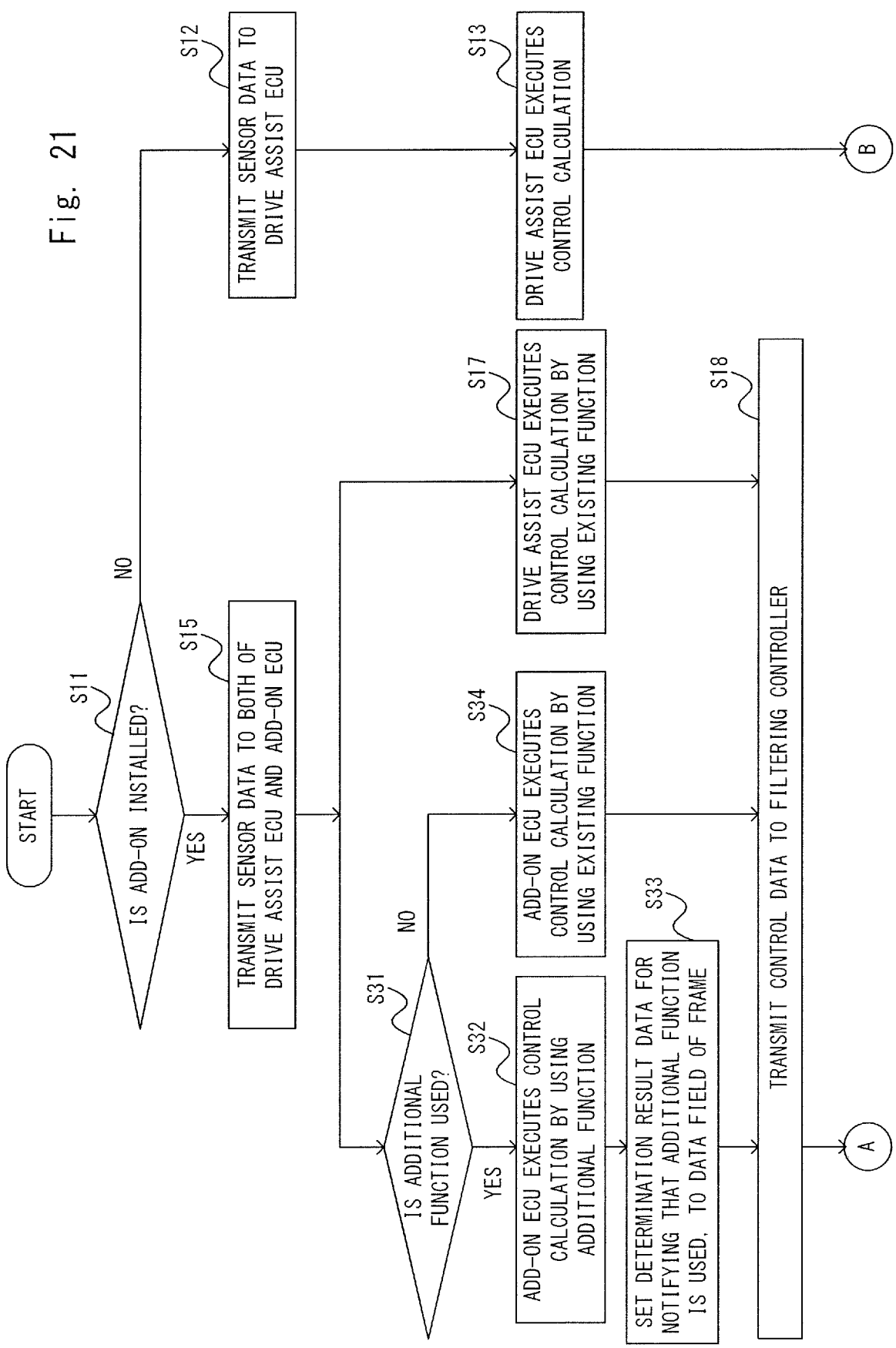
FIG. 21 is a flowchart (1/2) illustrating processing of the drive assist network system according to the eighth embodiment.
Figure 22:
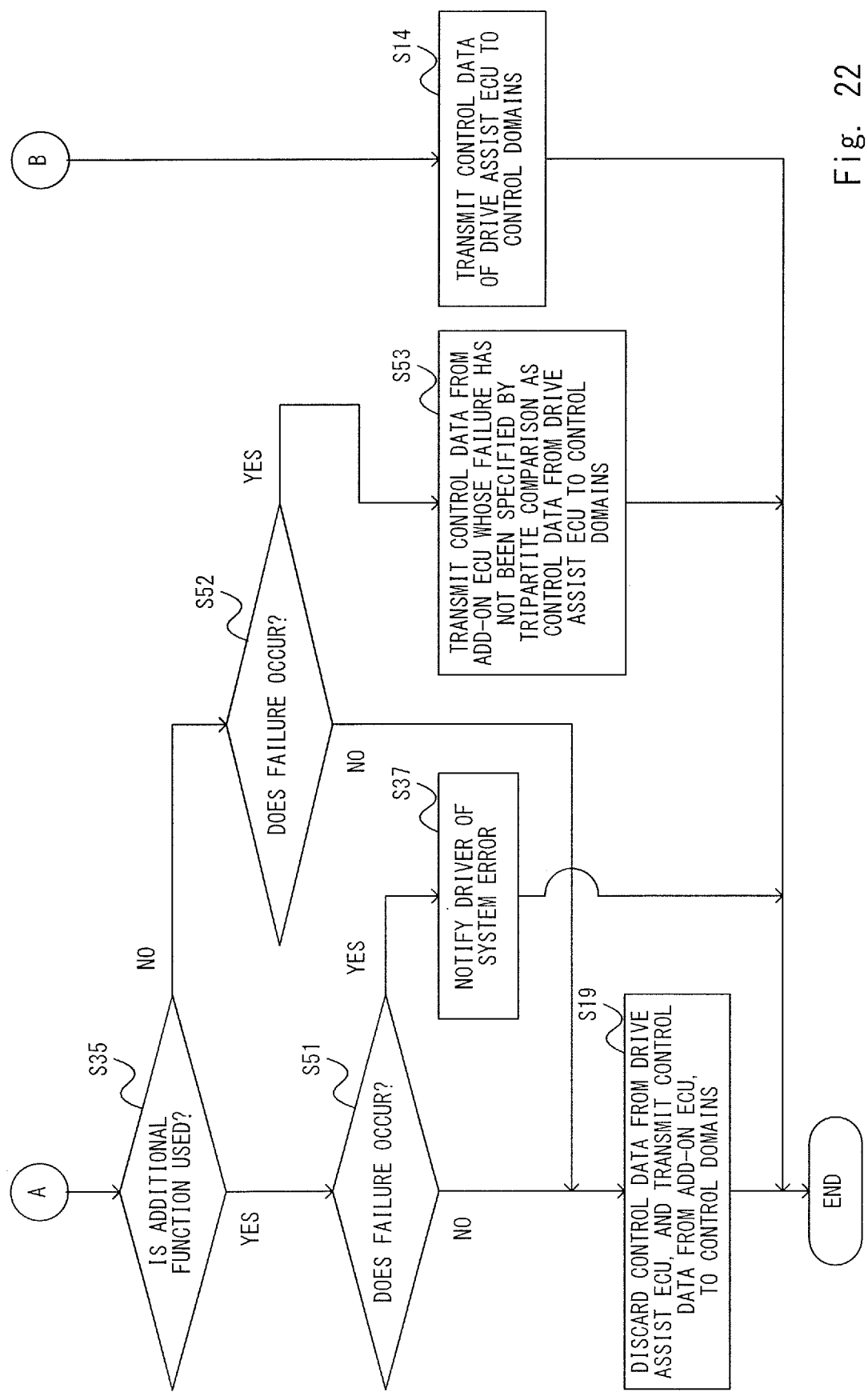
FIG. 22 is a flowchart (2/2) illustrating processing of the drive assist network system according to the eighth embodiment.

Next, the processing of the drive assist network system 1 according to the eighth embodiment will be described with reference to FIGS. 21 and 22.

The processing illustrated in FIGS. 21 and 22 differs from the processing in the third embodiment described with reference to FIGS. 13 and 14 in including steps S19, S37, and S51 to S53 at a subsequent stage of step S35 instead of steps S19, S36 and S37.

When determining to use the additional function (S35: Yes), the filtering controller 50 determines whether or not a failure occurs in one of the add-on ECU 60 and the add-on ECU 70 (S51). That is, the filtering controller 50 compares the control data from the add-on ECU 60 and the control data from the add-on ECU 70, and determines that a failure occurs in one of the add-on ECU 60 and the add-on ECU 70 when these items of control data do not match. When determining that the failure occurs in one of the add-on ECU 60 and the add-on ECU 70 (S51: Yes), the filtering controller 50 notifies the driver of an error (S37).

When determining to use the existing function (S35: No), the filtering controller 50 determines whether or not a failure occurs in one of the drive assist ECU 10, the add-on ECU 60 and the add-on ECU 70 (S52). That is, the filtering controller 50 compares the control data from the add-on ECU 60, the control data from the add-on ECU 70 and the control data from the drive assist ECU 10, and determines that a failure occurs when the two items of control data do not match. When determining that the failure occurs (S52: Yes), the filtering controller 50 transmits one of the two items of control data whose failures have not been specified by tripartite comparison, to the control domains 30 and 40.

Meanwhile, when determining that a failure does not occur (S51: No and S52: No), the filtering controller 50 transmits the control data from one of the add-on ECUs 60 and 70 as the control data from the drive assist ECU 10 to the control domains 30 and 40 (S19).

As described above, according to the eighth embodiment, by making redundant the drive assist functions of not only the existing functions mounted on all of the drive assist ECU 10 and the add-on ECUs 60 and 70 but also the additional functions mounted only on the add-on ECUs 60 and 70, it is possible to diagnose a failure by comparing outputs of these functions. Consequently, it is possible to further improve function safety at a system level.

Ninth Embodiment

Next, the ninth embodiment will be described. The same contents as those in the third embodiment will be described below while optionally omitting the contents by assigning the same reference numerals. In addition, the ninth embodiment will be described assuming that the ninth embodiment is constructed based on the third embodiment. However, the ninth embodiment can be also constructed based on one of the fourth to eighth embodiments.

In the above-described embodiments, an example where a central gateway 2 includes all functions of a filtering controller 50 has been described. However, an add-on ECU 60 may have part of these functions. This mode will be described in the ninth embodiment.

(Configuration of Drive Assist Network System 1 According to Ninth Embodiment)

Figure 23:
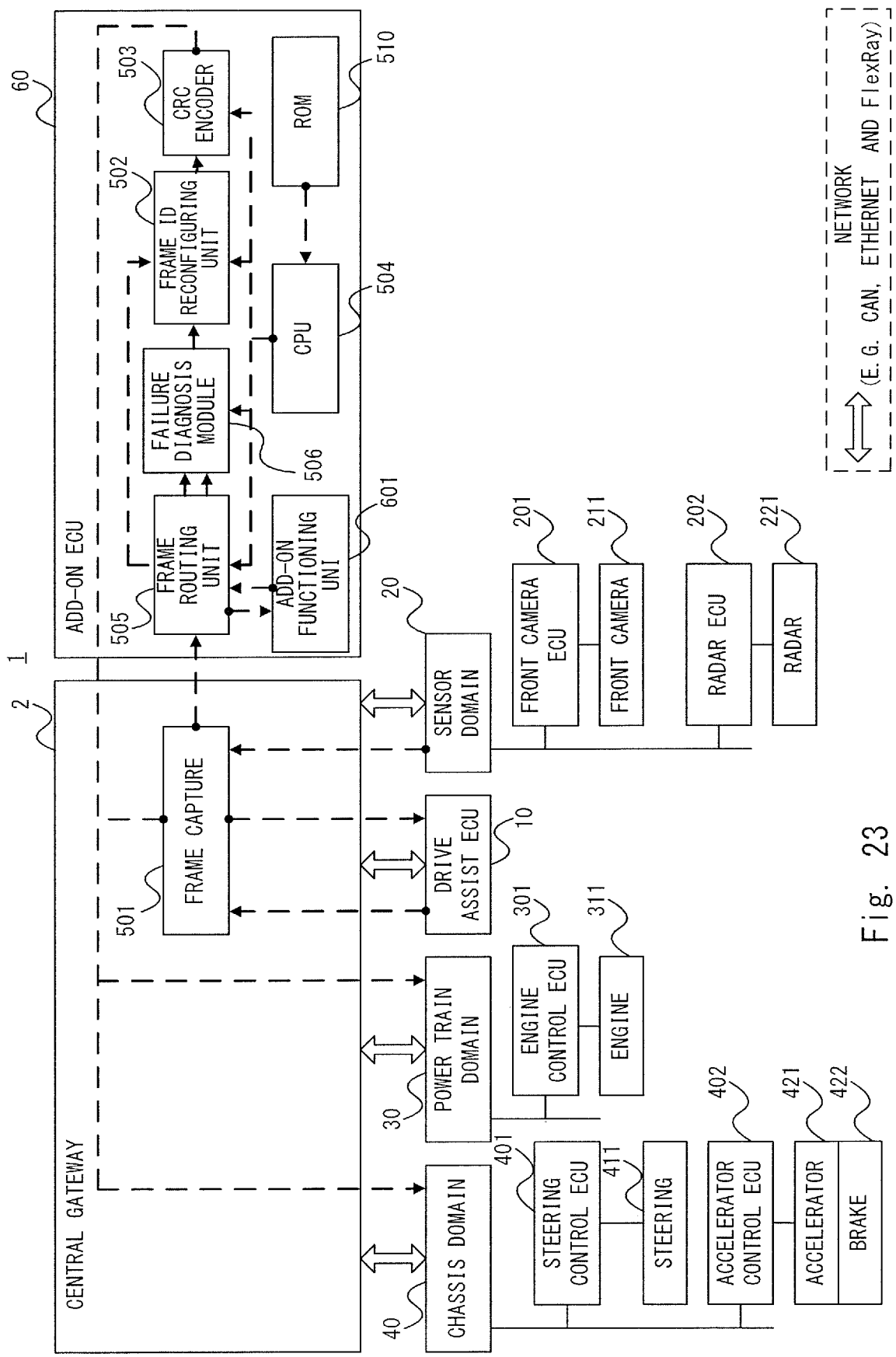
FIG. 23 is a view illustrating a configuration of a drive assist network system according to a ninth embodiment.

A configuration of a drive assist network system 1 according to the ninth embodiment will be described with reference to FIG. 23. As illustrated in FIG. 23, the drive assist network system 1 according to the ninth embodiment differs from the same drive assist network system according to the third embodiment as that in FIG. 1 in that the central gateway 2 does not include all functions of the filtering controller 50 and includes only a frame capture 501. Further, the difference includes that an add-on ECU 60 includes a frame ID reconfiguring unit 502, a CRC encoder 503, a CPU 504, a frame routing unit 505, a failure diagnosis module 506, a ROM 510 and an add-on functioning unit 601.

The frame capture 501 differs from the frame capture 501 according to the third embodiment in acquiring a data frame including control data transmitted from a drive assist ECU 10 without acquiring a data frame including control data transmitted from the add-on ECU 60 and transmitting the acquired data frame to the frame routing unit 505. For example, similar to the third embodiment, the central gateway 2 includes a ROM (not illustrated) in which frame ID data indicating a frame ID of the drive assist ECU 10 is stored, and a CPU (not illustrated), and the CPU notifies the frame capture 501 of the frame ID of the drive assist ECU 10 to enable the frame capture 501 to acquire the control data from the drive assist ECU 10. In addition, when the add-on ECU 60 is not connected to the central gateway 2 (frame capture 501), the frame capture 501 does not acquire the data frame from the drive assist ECU 10 and transmits the data frame as is to a transmission destination.

Further, FIG. 23 illustrates the add-on functioning unit 601 as an element of the add-on ECU 60 which generates control data based on sensor data. The add-on functioning unit 601 transmits the data frame including the generated control data to the frame routing unit 505. The processing subsequent to the processing of the frame routing unit 505 is the same as that in the third embodiment. Hence, in the ninth embodiment, the data frame transmitted from the add-on ECU 60 is not transmitted through the frame capture 501, so that the frame capture 501 does not need to acquire the data frame from the add-on ECU 60. Further, in the ROM 510, only frame ID data 513 indicating a frame ID newly set to a data frame among items of frame IDs 511 to 513 may be stored.

(Processing of Drive Assist Network System 1 According to Ninth Embodiment)

In addition, processing of the drive assist network system 1 according to the ninth embodiment is the same as the processing of the drive assist network system 1 according to the third embodiment described with reference to FIGS. 13 and 14, and therefore will not be described. In this regard, a difference includes that items of control data from the drive assist ECU 10 and the add-on ECU 60 (add-on functioning unit 601) are transmitted to the frame routing unit 505 instead of the filtering controller 50 in step S18.

As described above, according to the ninth embodiment, most of necessary components of the filtering controller 50 are realized by the add-on ECU 60. Consequently, it is possible to suppress a change amount of the existing central gateway.

Tenth Embodiment

Figure 24:
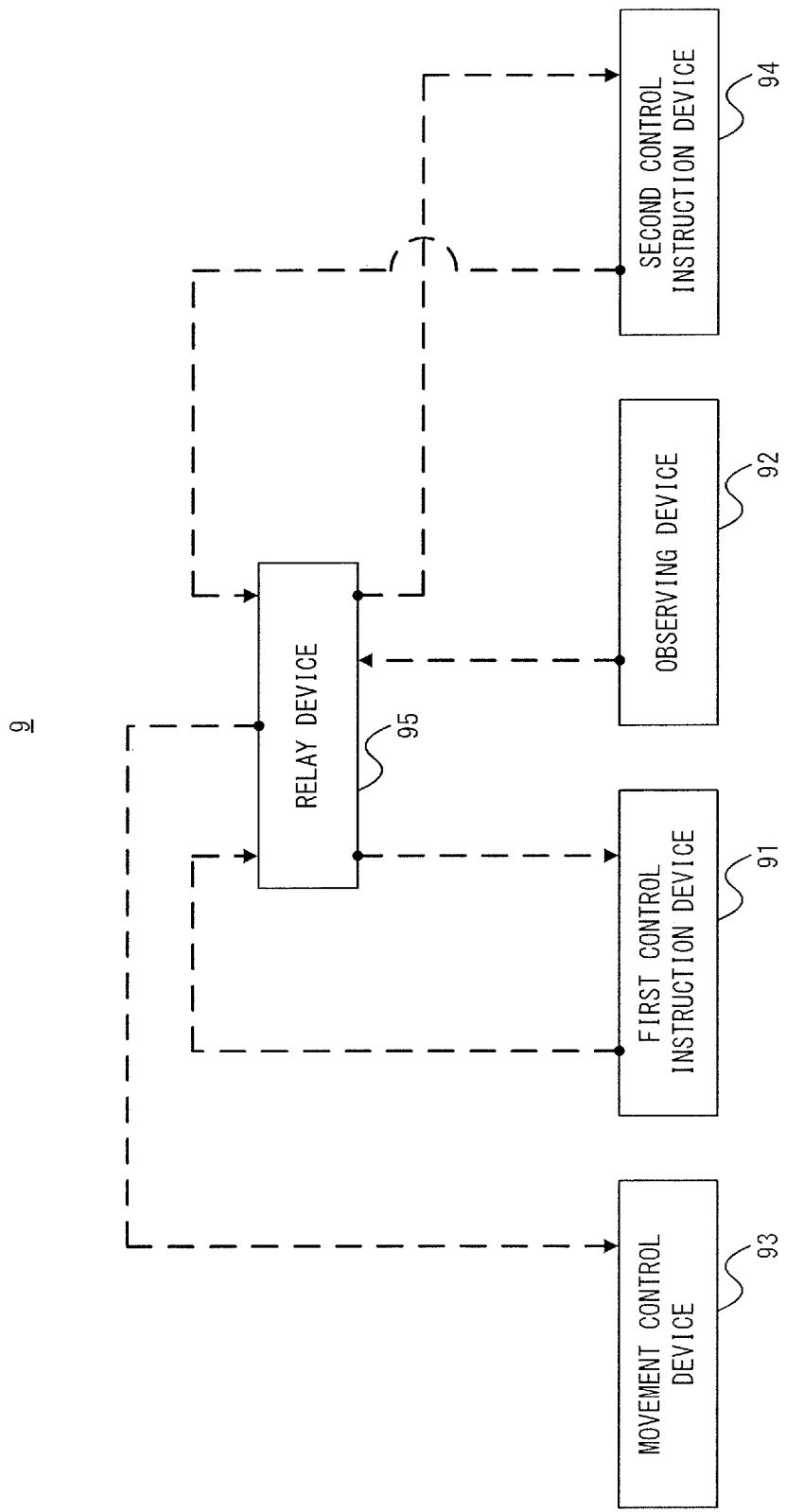
FIG. 24 is a view illustrating a configuration of a control system according to a tenth embodiment.

In this regard, one embodiment extracted from the above-described first to ninth embodiments will be described as the tenth embodiment with reference to FIG. 24. As illustrated in FIG. 24, a control system 9 according to the tenth embodiment includes a first control instruction device 91, an observing device 92, a movement control device 93, a second control instruction device 94 and a relay device 95. The control system 9 is a system mounted on a moving object.

The first control instruction device 91 determines control contents based on observation result data transmitted from an observing device, and transmits first control data indicating the determined control contents. The first control instruction device 91 corresponds to a drive assist ECU 10, a behavior control ECU 11 and an existing warning prediction determining device 12.

The observing device 92 observes surroundings of the moving object, and transmits observation result data indicating an observation result. The observing device 92 corresponds to a sensor domain 20 (a frame camera ECU 201 and a radar ECU 202), a front camera module 210, a radar module 220, a sensor unit 21 (a camera 231, a microphone 232 and various sensors 233) and a sensor 22.

The movement control device 93 controls movement of the moving object. The movement control device 93 corresponds to a power train domain 30 (engine control ECU 301), a chassis domain 40 (a steering control ECU 401 and an accelerator control ECU 402), an actuator control unit 31 (a head actuator 321, an arm actuator 322 and a leg actuator 323) and a water level rise warning device 32.

The second control instruction device 94 determines control contents based on the observation result data, and transmits second data indicating the determined control contents. The second control instruction device 94 corresponds to an add-on ECU 60, an add-on ECU 61, an add-on warning prediction determining device 62 and an add-on ECU 70.

According to a first aspect, the relay device 95 relays the first control data transmitted from the first control instruction device 91, to the movement control device 93. Further, when the second control instruction device 94 is provided to the control system 9, the relay device 95 transmits the second control data instead of the first control data to the movement control device 93. The relay device 95 corresponds to a filtering controller 50.

According to a second aspect, the relay device 95 relays the observation result data transmitted from the observing device 92 to the first control instruction device 91. Further, when the second control instruction device 94 is provided to the control system 9, the relay device 95 transmits the observation result data to the second control instruction device 94 instead of the first control instruction device 91. The relay device 95 corresponds to the filtering controller 50.

According to the above-described embodiment, it is not necessary to make in advance a mechanism which assumes addition of the second control instruction device 94, in the observing device 92 and the movement control device 93, and, only by adding the second control instruction device 94 to the control system 9, the second control instruction device 94 instead of the first control instruction device 91 can perform control. Consequently, it is possible to mount on the control system 9 the second control instruction device 94 which is added as a function to the first control instruction device 91 without changing peripheral devices 92 and 93 in advance and, consequently easily update the function.

The invention invented by the inventors has been specifically described based on the embodiments. However, the present invention is not limited to the above-described embodiments and can be variously changed without departing from the spirit of the invention.

A storage unit in which frame ID data or address data is stored in the filtering controller 50 is not limited to the ROM 510. For example, the storage unit may be configured to include arbitrary one of non-volatile memory devices such as the ROM 510 (e.g. a flash ROM), an EEPROM (Electrically Erasable Programmable Read-Only Memory) and a hard disk.

Further, in the third embodiment, in step S36, when control data from the drive assist ECU 10 and control data from the add-on ECU 60 match, the control data from the add-on ECU 60 is transmitted to a transmission destination. However, the present invention is not limited to this. For example, the control data from the drive assist ECU 10 may be transmitted to the transmission destination. This is the same when all items of control data match in step S52 in the eighth embodiment.

Further, in the first to ninth embodiments, cases where one front camera 211 and one radar 2221 are installed to face forward have been described. However, the present invention is not limited to this. Further, the front cameras 211 and the radars 221 may be provided to face toward sides and the rear of a car or a robot 3.

Part or entirety of the first to ninth embodiments can be also described as in the following supplementary notes.

(Supplementary Note 1)

A control system that is mounted on a moving object includes:

an observing device that observes surroundings of the moving object and transmits observation result data indicating an observation result;

a first control instruction device that determines control contents based on the observation result data transmitted from the observing device, and transmits first control data indicating the determined control contents;

a movement control device that controls movement of the moving object; and a relay device that relays the observation result data transmitted from the first control instruction device, to the first control instruction device, and when a second control instruction device that the determines control contents based on the observation result data and transmits second control data indicating the determined control contents is provided to the control system, the relay device transmits the observation result data, to the second control instruction device instead of the first control instruction device.

(Supplementary Note 2)

In the control system described in Supplementary Note 1, the first control data and the second control data are data frames that comply with a CAN protocol, and the relay device further relays the second control data transmitted from the second control instruction device, to the movement control device, and changes a frame ID of the data frame of the second control data from the frame ID of the second control data to a frame ID of the first control data.

(Supplementary Note 3)

In the control system described in Supplementary Note 2, the relay device calculates a CRC value based on the data frame of the changed frame ID, and sets the calculated CRC value to the data frame of the changed frame ID.

(Supplementary Note 4)

In the control system described in Supplementary Note 3, the moving object is a car, and the first control instruction device and the second control instruction device determine the control contents to hedge an obstacle in the surroundings of the car.

(Supplementary Note 5)

A relay device that relays data to be transmitted and received in a moving object, includes:

a first relaying unit that receives observation result data indicating an observation result of surroundings of the moving object, from an observing device and relays the observation result data to a first control instruction device that determines control contents of the moving object based on the observation result data; and a second relaying unit that receives first control data indicating the control contents of the moving object, from the first control instruction device, and relays the first control data to a movement control device that controls the moving object, and when a second control instruction device that determines control contents based on the relayed observation result data and transmits second control data indicating the determined control contents is provided to the moving object, the first relaying unit transmits the observation result data to the second control instruction device instead of the first control instruction device.

(Supplementary Note 6)

A control method that is performed in a moving object, includes:

a first transmitting step of, at an observing device, observing surroundings of the moving object, and transmitting observation result data indicating an observation result;

a relaying step of relaying the observation result data transmitted from the first control instruction device, to a first control instruction device;

a second transmitting step of, at the first control instruction device, determining control contents of the moving object based on the transmitted observation result data, and transmitting first control data indicating the determined control contents; and a controlling step of, at a movement control device, controlling movement of the moving object based on the transmitted control data, and when a second control instruction device that determines control contents based on the observation result data and transmits second control data indicating the determined control contents is provided to the moving object, the observation result data is transmitted to the second control instruction device instead of the first control instruction device in the relaying step.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first and ninth embodiments can be combined as desirable by one of ordinary skill in the art.

What is claimed is:

1. A control system that is mounted on a moving object includes:

an observing device that observes surroundings of the moving object and transmits observation result data indicating an observation result;

a first control instruction device that determines control contents based on the observation result data transmitted from the observing device, and transmits first control data indicating the determined control contents;

a movement control device that controls movement of the moving object; and a relay device that relays the observation result data transmitted from the observing device, to the first control instruction device, wherein when a second control instruction device that determines control contents based on the observation result data and transmits second control data indicating the determined control contents is provided to the control system, the relay device transmits the observation result data, to the second control instruction device instead of the first control instruction device.

2. The control system according to claim 1, wherein the first control data and the second control data are data frames that comply with a CAN protocol, and the relay device further relays the second control data transmitted from the second control instruction device, to the movement control device, and changes a frame ID of the data frame of the second control data from the frame ID of the second control data to a frame ID of the first control data.

3. The control system according to claim 2, wherein the relay device calculates a CRC value based on the data frame of the changed frame ID, and sets the calculated CRC value to the data frame of the changed frame ID.

4. The control system according to claim 3, wherein the moving object is a car, and the first control instruction device and the second control instruction device determine the control contents to hedge an obstacle in the surroundings of the car.

5. A relay device that relays data to be transmitted and received in a moving object, the relay device being configured to:

receive observation result data indicating an observation result of surroundings of the moving object, from an observing device, relay the observation result data to a first control instruction device that determines control contents of the moving object based on the observation result data, receive first control data indicating the control contents of the moving object, from the first control instruction device, and relay the first control data to a movement control device that controls the moving object, wherein when a second control instruction device that determines control contents based on the relayed observation result data and transmits second control data indicating the determined control contents is provided to the moving object, the relay device transmits the observation result data to the second control instruction device instead of the first control instruction device and transmits the second control data instead of the first control data, to the movement control device.

6. A control method that is performed in a moving object, includes:

a first transmitting step of, at an observing device, observing surroundings of the moving object, and transmitting observation result data indicating an observation result;

a relaying step of relaying the observation result data transmitted from the observing device, to a first control instruction device;

a second transmitting step of, at the first control instruction device, determining control contents of the moving object based on the transmitted observation result data, and transmitting first control data indicating the determined control contents; and a controlling step of, at a movement control device, controlling movement of the moving object based on the transmitted control data, wherein when a second control instruction device that determines control contents based on the observation result data and transmits second control data indicating the determined control contents is provided to the moving object, the observation result data is transmitted to the second control instruction device instead of the first control instruction device in the relaying step.

* * * * *